US012711390B2

(12) United States Patent
Sandberg et al.

(10) Patent No.: US 12,711,390 B2
(45) Date of Patent: Aug. 18, 2026

(54) TRAINING AND USING A NEURAL NETWORK FOR MANAGING AN ENVIRONMENT IN A COMMUNICATION NETWORK

(71) Applicant: Telefonaktiebolaget LM Ericsson (publ), Stockholm (SE)

(72) Inventors: David Sandberg, Sundbyberg (SE); Tor Kvernvik, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 592 days.

(21) Appl. No.: 18/273,818

(22) PCT Filed: Jan. 26, 2021

(86) PCT No.: PCT/EP2021/051777
§ 371 (c)(1),
(2) Date: Jul. 24, 2023

(87) PCT Pub. No.: WO2022/161599
PCT Pub. Date: Aug. 4, 2022

(65) Prior Publication Data
US 2024/0086715 A1 Mar. 14, 2024

(51) Int. Cl.
*G06N 3/09* (2023.01)
*G06N 3/092* (2023.01)

(52) U.S. Cl.
CPC .................................... *G06N 3/092* (2023.01)

(58) Field of Classification Search
CPC ...... G06N 3/092; G06N 3/045; G06N 3/0499; G06N 3/088; G06N 3/006; G06N 3/08;
(Continued)

(56) References Cited

U.S. PATENT DOCUMENTS 11,514,305 B1 * 11/2022 Commons ............ G06N 3/0455
2016/0078339 A1 * 3/2016 Li .......................... G06N 3/084 706/20

(Continued)

OTHER PUBLICATIONS

Hu, "Distributed Machine Learning for Wireless Communication Networks: Techniques, Architectures, and Applications", 2020. (Year: 2020).*

(Continued)

*Primary Examiner* — Dave Misir
(74) *Attorney, Agent, or Firm* — Withrow & Terranova, PLLC

(57) ABSTRACT

Computer implemented methods for training a Student Neural Network, SNN, and for managing an environment of a communication network using a trained SNN are disclosed. The SNN is for generating an action prediction matrix for an environment in a communication network, the action prediction matrix comprising action predictions for a plurality of nodes or resources in the environment. The training method comprises using a Reinforcement Learning process to train a Teacher Neural Network, TNN, to generate an action prediction for a resource or node in the environment, and using the trained TNN to generate a first training data set including action predictions for individual nodes or resources. The training method further comprises generating a second training data set from the first training data set such that the second training data set includes action prediction matrices, and using the second training data set to update values of the parameters of the SNN.

18 Claims, 30 Drawing Sheets

(58) Field of Classification Search
CPC ..... G06N 5/01; H04L 41/0806; H04L 41/147; H04L 41/16; H04L 45/08; H04W 24/02
See application file for complete search history.

(56) References Cited

U.S. PATENT DOCUMENTS

| | | | | |
|---|---|---|---|---|
| 2019/0372644 | A1* | 12/2019 | Chen | G06N 3/126 |
| 2020/0357384 | A1* | 11/2020 | Kim | G10L 15/063 |
| 2020/0358514 | A1* | 11/2020 | Landis | H04B 17/3913 |
| 2021/0182662 | A1* | 6/2021 | Lai | G06N 3/045 |
| 2022/0344049 | A1* | 10/2022 | Hall | G06N 3/098 |

OTHER PUBLICATIONS

Jang, "Knowledge Transfer for On-Device Deep Reinforcement Learning in Resource Constrained Edge Computing Systems". IEEE Access, 2020. (Year: 2020).*

Hinton, et al., "Distilling the Knowledge in a Neural Network," 28th Conference on Neural Information Processing Systems, Dec. 8-13, 2014, Montreal, Canada, 9 pages.

Liu, et al., "Developing Multi-Task Recommendations with Long-Term Rewards via Policy Distilled Reinforcement Learning," Computer Science, Jan. 2019, Association for Computing Machinery, 30 pages.

Sana, et al., "Multi-Agent Reinforcement Learning for Adaptive User Association in Dynamic mmWave Networks," EEE Transactions on Wireless Communications, vol. 19, Issue 10, Oct. 2020, pp. 6520-6534.

Rusu, et al., "Policy Distillation," International Conference on Learning Representations, May 2-4, 2016, San Juan, Puerto Rico, 13 pages.

Silver, et al., "Mastering Chess and Shogi by Self-Play with a General Reinforcement Learning Algorithm," Nature, vol. 550, Dec. 2017, 19 pages.

International Search Report and Written Opinion for International Patent Application No. PCT/EP2021/051777, mailed Oct. 28, 2021, 14 pages.

* cited by examiner

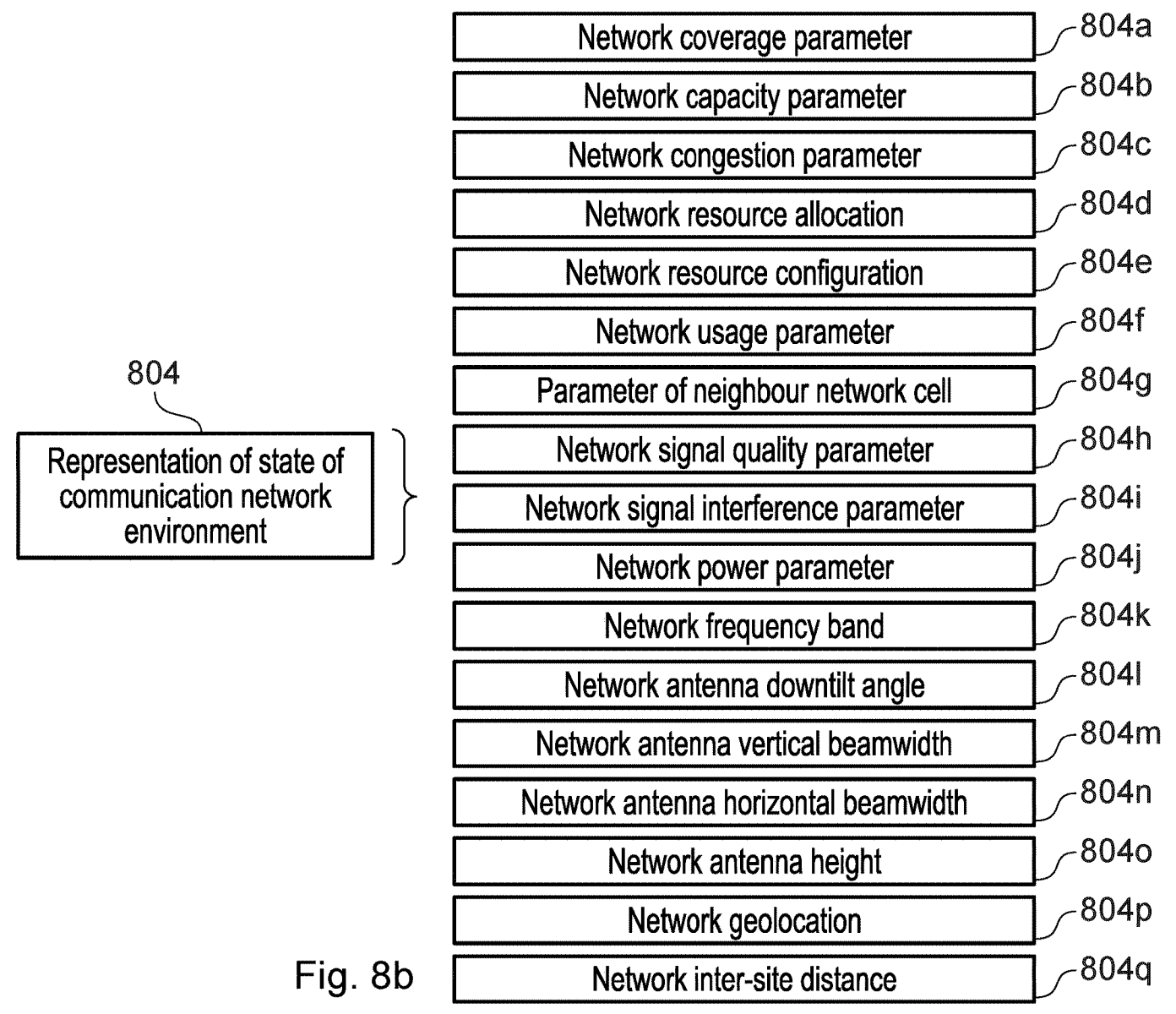

804 Representation of state of communication network environment

804a Network coverage parameter

804b Network capacity parameter

804c Network congestion parameter

804d Network resource allocation

804e Network resource configuration

804f Network usage parameter

804g Parameter of neighbour network cell

804h Network signal quality parameter

804i Network signal interference parameter

804j Network power parameter

804k Network frequency band

804l Network antenna downtilt angle

804m Network antenna vertical beamwidth

804n Network antenna horizontal beamwidth

804o Network antenna height

804p Network geolocation

804q Network inter-site distance

Fig. 8b

Stem shls: hidden layer sizes for the stem
Value head vhls: hidden layer sizes for the value head
Policy head phls: hidden layer sizes for the policy head 20200523-183649, hls=128,128,128,128,128,128,128, phls=128,128,128, vhls=128,128,128, wd=le-05, plw=0.99, lr=0.0001 (1.623)
20200523-012809, hls=128,128,128,128,128,128, phls=128,128,128, vhls=128,128,128, wd=le-05, plw=0.99, lr=0.0001 (1.635)
20200523-023616, hls=128,128,128,128,128, phls=128,128,128, vhls=128,128,128, wd=le-05, plw=0.99, lr=0.0001 (1.648)
20200523-034101, hls=128,128,128,128, phls=128,128,128, vhls=128,128,128, wd=le-05, plw=0.99, lr=0.0001 (1.653)
20200523-044003, hls=128,128,128,128,128,128,128, phls=128,128, vhls=128,128, wd=le-05, plw=0.99, lr=0.0001 (1.640)
20200523-054557, hls=128,128,128,128,128,128,128, phls=128, vhls=128, wd=le-05, plw=0.99, lr=0.0001 (1.627)
20200523-134255, hls=128,128,128,128, phls=128,128, vhls=128,128, wd=le-05, plw=0.99, lr=0.0001 (1.634)
20200523-143837, hls=128,128,128,128, phls=128, vhls=128, wd=le-05, plw=0.99, lr=0.0001 (1.629)
20200523-153130, hls=128,128,128, phls=128, vhls=128, wd=le-05, plw=0.99, lr=0.0001 (1.612)
20200523-162056, hls=128,128, phls=128, vhls=128, wd=le-05, plw=0.99, lr=0.0001 (1.615)
20200523-170542, hls=128,128,128, phls=128,128,128, vhls=128,128,128, wd=le-05, plw=0.99, lr=0.0001 (1.633)
20200523-180124, hls=128,128, phls=128,128,128, vhls=128,128,128, wd=le-05, plw=0.99, lr=0.0001 (1.622)
20200523-185331, hls=128, phls=128,128,128, vhls=128,128,128, wd=le-05, plw=0.99, lr=0.0001 (1.612)

Fig. 17 (Continued)

TRAINING AND USING A NEURAL NETWORK FOR MANAGING AN ENVIRONMENT IN A COMMUNICATION NETWORK

This application is a 35 U.S.C. § 371 national phase filing of International Application No. PCT/EP2021/051777, filed Jan. 26, 2021, the disclosure of which is incorporated herein by reference in its entirety.

TECHNICAL FIELD

The present disclosure relates to methods for training a Student Neural Network, and for managing an environment of a communication network using a trained Student Neural Network. The present disclosure also relates to a training node, a management node and to a computer program and a computer program product configured, when run on a computer to carry out methods performed by a training node and a management node.

BACKGROUND

In a majority of cases in which a Machine Learning (ML) model is deployed for use, essentially the same model is used both in a training phase and in an online operation phase, although the requirements and constraints for the two phases are often quite different. During a training phase, the aim may be to explore a possibly very large and complex state-action space, or to extract structure from large data sets. Training generally does not need to operate in real time, and frequently has access to significant computation resources. In contrast, online operation is no longer required to explore or find meaning, but simply to infer an action, classification etc. from current information. Online operation is frequently subject to much more significant constraints regarding acceptable latency and available computation resources than is the case for training. The management of communication networks in particular offers many examples of problems in which the use of ML models may assist with exploration of a huge and complex state-action space, but the online operation of such models is subject to exacting latency requirements.

Distillation of ML models has been demonstrated to be a highly efficient technique for addressing this disparity between training and operational requirements. As discussed for example by Geoffrey Hinton et al. in "Distilling the Knowledge in a Neural Network" (arXiv:1503.02531), ML model distillation involves a transfer of knowledge from a large and potentially cumbersome model that has been trained for a particular task, to a smaller model that is more suitable for deployment but achieves similar or even improved accuracy when compared with the original large model. ML model distillation can lead to reduced delay and reduced computation cost during inference. As discussed above, with training usually performed off-line, and often in a simulated environment, it is the online inference in the real environment that benefits the most by being optimized for performance. Hinton et al propose in the above referenced paper that in order to transfer the knowledge from the large trained model, the smaller inference model should be trained to output the same probability distribution over classes as the large model. That is, not only should the most probable class be the same, but the probabilities of the other classes should be similar as well. It is argued that this training using soft labels gives a much richer learning signal which helps to retain the performance of the large model in the small model, despite the smaller number of trainable parameters. In the paper "Policy Distillation" (arXiv:1511.06295), Andrei A. Rusu et al. propose a similar approach to that discussed above but applied specifically to neural networks that express a policy trained using Reinforcement Learning. This paper specifically addresses Deep Q Networks, and difficulties when the policy is expressed as a Q-function that has a much larger dynamic range than the probabilities from a softmax function for a classification problem.

Many communication network management problems, including for example radio resource allocation, Remote Electronic Tilt (RET) optimisation, packet routing, etc. have extremely large, structured and combinatorial action spaces. While RL algorithms may be of use in supporting the exploration of such action spaces, in practice, most existing algorithms for such problems resort to some kind of heuristics. As a consequence of this reliance on heuristics, the potential for improved efficiency in online operations that is offered by ML model distillation is of limited practical application for such problems.

SUMMARY

It is an aim of the present disclosure to provide a training node, a management node, methods performed by such nodes, and a computer readable medium which at least partially address one or more of the challenges discussed above. It is a further aim of the present disclosure to provide a training node, management node, computer readable medium and associated methods which cooperate to facilitate selection of optimal or close to optimal actions in the management of an environment of a communication network without relying on pre-programmed heuristics and while satisfying latency requirements for time critical online operations.

According to a first aspect of the present disclosure, there is provided a computer implemented method for training a Student Neural Network having a plurality of parameters. The Student Neural Network is for generating an action prediction matrix for an environment in a communication network, the environment comprising a plurality of nodes and a plurality of communication network resources. The action prediction matrix comprises a plurality of action predictions for actions that may be executed within the environment, and each action prediction of the action prediction matrix relates to at least one of a node or a resource in the environment. The method, performed by a training node, comprises using a Reinforcement Learning process to train a Teacher Neural Network to generate an action prediction for a resource or node in the environment. The method further comprises using the trained Teacher Neural Network to generate a first training data set by, for each of a plurality of training situations:

- generating a representation of a state of the environment, the state representation comprising a current version of a partial action matrix that comprises actions for execution within the environment, each action relating to at least one of a node or a resource in the environment; and
- sequentially, for each node or each resource in the environment:
  - using the trained Teacher Neural Network to generate an action prediction relating to the node or resource based on the state representation;
  - adding the state representation and the generated action prediction to the first training data set;

selecting an action for execution on the node or the resource in accordance with the action prediction; and updating the state representation to include the selected action in the partial action matrix;

The method further comprises generating a second training data set from the first training data set by, for each of the plurality of training situations:

generating a training situation state representation comprising values that are common to all of the state representations for the training situation in the first training data set; and generating a training situation action prediction matrix comprising all of the generated action predictions for the training situation in the first training data set.

The method further comprises using the second training data set to update values of the parameters of the Student Neural Network.

According to another aspect of the present disclosure, there is provided a computer implemented method for managing an environment within a communication network, the environment comprising a plurality of nodes and a plurality of communication network resources. The method, performed by a management node, comprises generating a representation of a state of the environment, and using a trained Student Neural Network to generate an action prediction matrix on the basis of the state representation. The action prediction matrix comprises a plurality of action predictions for actions that may be executed within the environment, and each action prediction of the action prediction matrix relates to at least one of a node or a resource in the environment. The method further comprises selecting actions for execution in the environment on the basis of the generated action prediction matrix, and initiating execution of the selected actions. The Student Neural Network comprises a network that has been trained using a method according to an example of the present disclosure.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one or more of aspects or examples of the present disclosure.

According to another aspect of the present disclosure, there is provided a training node for training a Student Neural Network having a plurality of parameters. The Student Neural Network is for generating an action prediction matrix for an environment in a communication network, the environment comprising a plurality of nodes and a plurality of communication network resources. The action prediction matrix comprises a plurality of action predictions for actions that may be executed within the environment, and each action prediction of the action prediction matrix relates to at least one of a node or a resource in the environment. The training node comprises processing circuitry configured to cause the training node to use a Reinforcement Learning process to train a Teacher Neural Network to generate an action prediction for a resource or node in the environment. The processing circuitry is further configured to cause the training node to use the trained Teacher Neural Network to generate a first training data set by, for each of a plurality of training situations:

generating a representation of a state of the environment, the state representation comprising a current version of a partial action matrix that comprises actions for execution within the environment, each action relating to at least one of a node or a resource in the environment; and sequentially, for each node or each resource in the environment:

using the trained Teacher Neural Network to generate an action prediction relating to the node or resource based on the state representation;

adding the state representation and the generated action prediction to the first training data set;

selecting an action for execution on the node or the resource in accordance with the action prediction; and updating the state representation to include the selected action in the partial action matrix.

The processing circuitry is further configured to cause the training node to generate a second training data set from the first training data set by, for each of the plurality of training situations:

generating a training situation state representation comprising values that are common to all of the state representations for the training situation in the first training data set; and generating a training situation action prediction matrix comprising all of the generated action predictions for the training situation in the first training data set.

The processing circuitry is further configured to cause the training node to use the second training data set to update values of the parameters of the Student Neural Network.

According to another aspect of the present disclosure, there is provided a management node for managing an environment within a communication network, the environment comprising a plurality of nodes and a plurality of communication network resources. The management node comprises processing circuitry configured to cause the management node to generate a representation of a state of the environment, use a trained Student Neural Network to generate an action prediction matrix on the basis of the state representation. The action prediction matrix comprises a plurality of action predictions for actions that may be executed within the environment, and each action prediction of the action prediction matrix relates to at least one of a node or a resource in the environment. The processing circuitry is further configured to cause the management node to select actions for execution in the environment on the basis of the generated action prediction matrix, and to initiate execution of the selected actions. The Student Neural Network comprises a network that has been trained using a method according to an example of the present disclosure.

Examples of the present disclosure thus enable the training of a time efficient Student Neural Network (SNN) for inference, the SNN being a "one-shot" model that maps directly to action predictions for a plurality of nodes or resources in an environment. Despite being a "one-shot" model, the trained SNN nonetheless incorporates learning gained using the exploration of a large action space that is offered by sequential processes. This learning is incorporated through the use of a Teacher Neural Network (TNN), trained using a sequential process, to generate a first training data set, and the transformation of the first training data set to a second training data set for training the SNN.

BRIEF DESCRIPTION OF THE DRAWINGS

For a better understanding of the present disclosure, and to show more clearly how it may be carried into effect, reference will now be made, by way of example, to the following drawings in which:

FIGS. 8*a* to 8*d* illustrate example options for the methods of FIGS. 6 and 7 according to different use cases;

DETAILED DESCRIPTION

Figure 1:
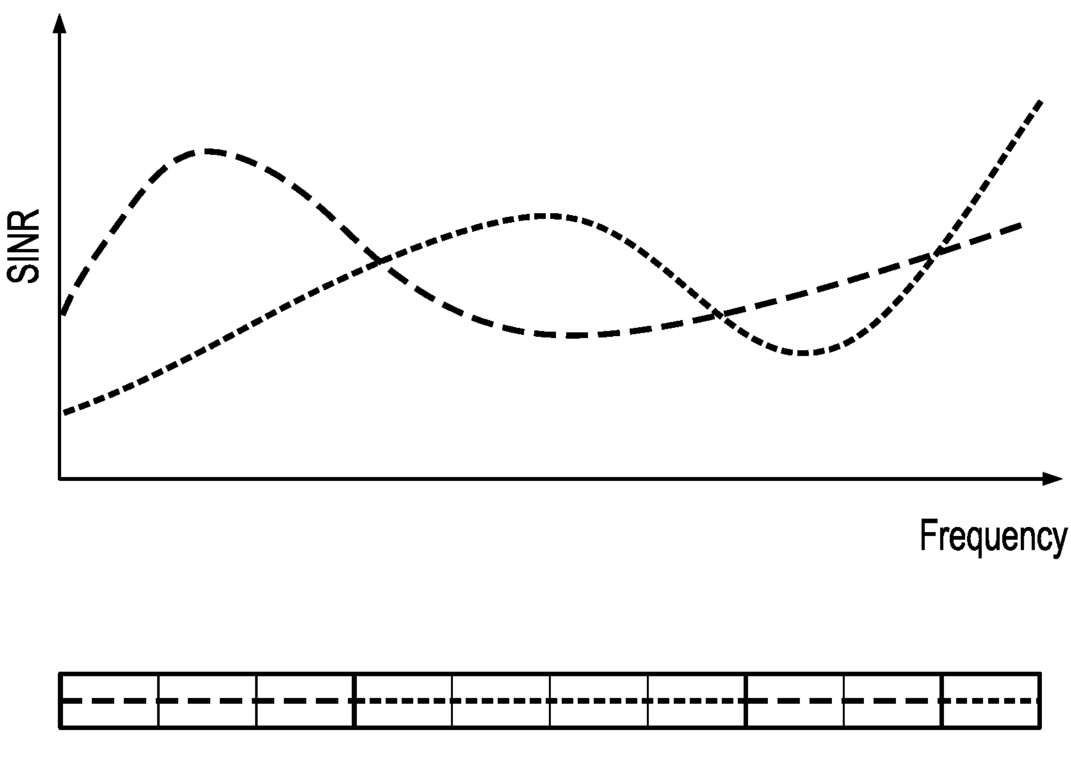
FIG. 1 illustrates an example scheduling problem in which two users with different channel quality are scheduled using frequency selective scheduling.

The present disclosure proposes methods for training a Student Neural Network (SNN) that is operable to guide selection of actions for a plurality of nodes or resources in a communication network environment. Examples of the present disclosure propose initially to train a Teacher Neural Network (TNN) to guide selection of an action for an individual node or resource in such a communication network environment. Examples of actions may include resource allocation for a user node, adjustment of remote antenna tilt, a configuration of a node or node operation, a packet routing decision, etc. It is envisaged that the TNN may be trained for situations or problems in which actions for a plurality of nodes or resources are to be generated for a given situation, including for example resource allocation for a plurality of user nodes in a communication network cell over a Transmission Time Interval (TTI), antenna tilt settings for a plurality of neighbouring cells, or packet routing decisions for a packet traversing a plurality of nodes from source to destination. Although such situations or problems are not themselves sequential in nature, the TNN model is trained according to examples of the present disclosure using a sequential process. In such a process, actions for nodes or resources in the communication network environment are selected for a particular problem "one by one", integrating an action for a node or resource that has already been selected for the present problem into a representation of a current state of the environment, so as to guide selection of actions for nodes or resources that have not yet been considered.

The trained TNN may be considered as a "multi-shot" model, in that a single inference generated by the model guides selection of an action for a single node or resource, and consequently multiple inferences of the model are required to guide selection of actions for every node or resource that is to be considered in the environment. According to examples of the present disclosure, the trained TNN is then used to generate a first "multi-shot" training data set, comprising, for each of a plurality of training situations, representations of a state of the environment, and the corresponding output of the TNN that guides selection of an action for a node or resource. According to examples of the present disclosure, this multi-shot training data set is then transformed into a second "one-shot" training data set, so as to allow training of the one-shot SNN. In contrast to the multi-shot TNN, the one-shot SNN provides an output guiding selection of actions for the current problem for all nodes or resources to be considered in the environment. The one-shot SNN therefore need only be run once in order to generate an output guiding selection of actions for all nodes or resources to be considered in the environment. The SNN in effect provides a direct mapping from a representation of a state of the environment to an output guiding selection of actions for each node or resource to be considered. When compared with the multi-shot TNN, which must be run once for each node or resource for which an action is to be selected, the one-shot SNN offers a significant reduction in the time taken for online inference. According to examples of the present disclosure, the transformation of the multi-shot training data set to the one-shot training data set additionally incorporates techniques from ML model distillation, ensuring that the SNN, in addition to one-shot operation, can also be smaller and hence faster to run than the TNN, while nonetheless incorporating the knowledge gained through training of the TNN.

It will be appreciated from the preceding discussion that examples of the present disclosure are particularly applicable to use cases in which the relevant problem is not sequential by nature, but nonetheless encompasses an action space that may be very large and complex, and for which the online operation is subject to significant time constraints. Such problems may be referred to as time critical optimisation problems, examples of which include resource scheduling, Remote Electronic Tilt (RET), packet routing, downlink power setting, etc. Sequential learning methods, including Monte Carlo Tree Search as discussed below, can be highly successful in solving problems with a large and complex action space, but the time required to execute such methods means they are not suitable for online deployment in situations where time delay is critical. Examples of the present disclosure provide methods enabling real-time decisions to be made over complex combinatorial or structured action spaces, which real-time decisions encapsulate learning achieved using sequential decision-making techniques.

In order to provide additional context for the methods and nodes proposed herein, there now follows a more detailed discussion of an example problem that is non-sequential by nature, but which may benefit from a sequential approach, together with an explanation of a method according to which a sequential learning algorithm may be used to train a Neural Network for multi-shot inference to address this problem. There then follows a detailed discussion of methods according to the present disclosure, followed by further explanation of implementation detail for these methods, and multiple example use cases. The example problem presented below is frequency selective scheduling.

One of the roles of a Radio Access Node or base station in a cellular communication network is to allocate radio resources to users, a process that is performed once per Transmission Time Interval (TTI), generally with the aim of optimizing some objective, like sum throughput. The TTI duration in 5th generation communication networks depends on the sub-carrier spacing and whether mini-slot scheduling is used, but is generally of the order of 1 ms or less. When a base station allocates resources to users it can use information about the latency and throughput requirements for each user as well as traffic type and users' instantaneous channel quality (including potential interference from other users) etc. Different users are typically allocated to different frequency resources (referred to herein as Physical Resource Blocks) in a process referred to as frequency selective scheduling, but users can also be allocated to overlapping frequency resources in case of Multi-User MIMO (MU-MIMO).

FIG. 1 illustrates a frequency selective scheduling case with two UEs and one UE being scheduled for each Physical Resource Block (PRB). The state of a UE is represented by the amount of data in the RLC buffer and the Signal to Interference plus Noise Ratio (SINR) per PRB. In the first 3 resource blocks it is most favourable to schedule the UE represented by the dashed line, and in the next four blocks it is more favourable to schedule the UE represented by the dotted line. This simple scheduling problem can be handled with a simple mechanism, but scheduling in a live network comprising many more UEs and PRBs is considerably more complex, particularly when allowing the possibility of allocating users to overlapping frequency resources. An unpublished internal reference document considers the problem of frequency selective scheduling, and proposes to reframe the problem of resource allocation for a TTI as a sequential problem. "Sequential" in this context refers to an approach of "one by one", without implying any particular order or hierarchy between the elements that are considered "one by one". This approach is a departure from previous methods, which viewed the process of deciding which resources to schedule to which users as a single challenge, mapping information about users and radio resources during a TTI directly to a scheduling plan for that interval. The reframing of frequency selective scheduling as a sequential problem allows for the application of methods that are tailored to such sequential decision-making problems in order to find optimal or near optimal scheduling decisions.

The above-mentioned internal reference document uses a combination of look ahead search, such as Monte Carlo Tree Search (MCTS), and Reinforcement Learning to train a sequential scheduling policy which is implemented by a neural network during online execution. During training, which may be performed off-line in a simulated environment, the neural network is used to guide the look ahead search. The trained neural network policy may then be used in a base station in a live network to allocate radio resources to users during a TTI.

Sequential Learning Algorithm

An algorithm combining MCTS and reinforcement learning for game play has been proposed by DeepMind Technologies Limited in the paper 'Mastering Chess and Shogi by Self-Play with a general Reinforcement Learning Algorithm' (https://arxiv.org/abs/1712.01815). The algorithm, named AlphaZero, is a general algorithm for solving any game with perfect information i.e. the game state is fully known to both players at all times. No prior knowledge except the rules of the game is needed. A brief outline of the main concepts of AlphaZero is provided below.

Figure 2:
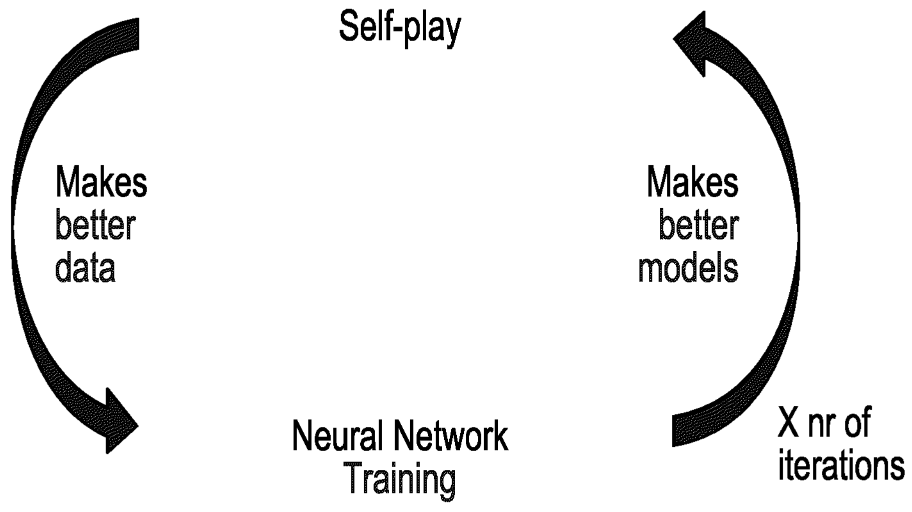
FIG. 2 illustrates phases of the AlphaZero game play algorithm.

FIG. 2 illustrates the two main phases of AlphaZero: self-play 202 and Neural Network training 204. During self-play 202, AlphaZero plays against itself, with each side choosing moves selected by MCTS, the MCTS guided by a neural network model which is used to predict a policy and value. The results of self-play games are used to continually improve the neural network model during training 204. The self-play and neural network training occur in a sequence, each improving the other, with the process performed for a number of iterations until the neural network is fully trained. The quality of the neural network can be measured by monitoring the loss of the value and policy prediction, as discussed in further detail below.

Figure 3:
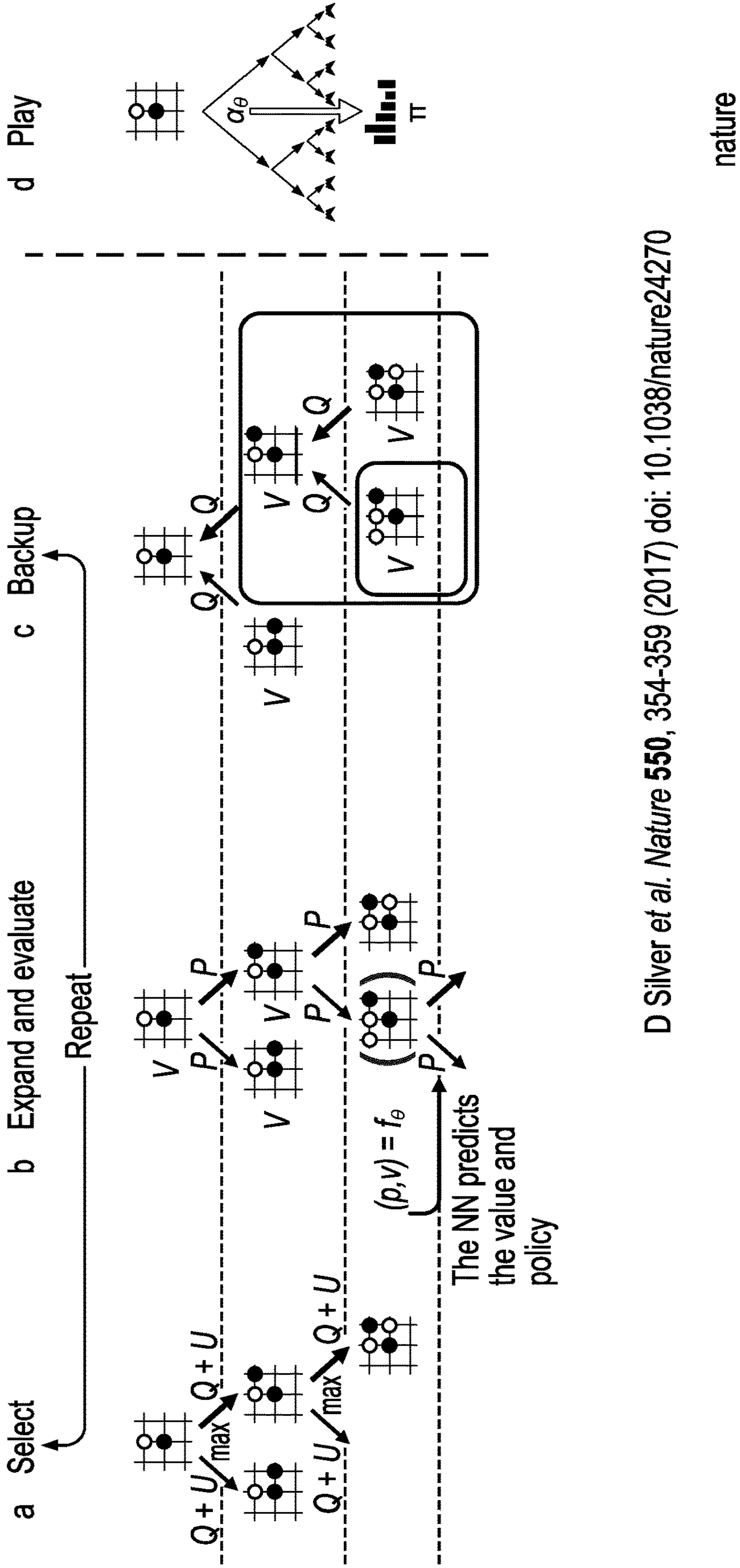
FIG. 3 illustrates self-play using Monte-Carlo Tree Search.

FIG. 3 illustrates self-play using Monte-Carlo Tree Search, and is reproduced from D Silver et al. Nature 550, 354-359 (2017) doi: 10.1038/Nature24270. In the tree search, each node of the tree represents a game state, with valid moves in the game transitioning the game from one state to the next. The root node of the tree is the current game state, with each node of the tree representing a possible future game state, according to different game moves. Referring to FIG. 3, self-play using MCTS comprises the following steps:

a) Select: Starting at the root node, walk to the child node with maximum Polynomial Upper Confidence Bound for Trees (PUCT i.e. max Q+U as discussed below) until a leaf node is found.
b) Expand and Evaluate: Expand the leaf node and evaluate the associated game state s using the neural network. Store the vector of probability values P in the outgoing edges from s.
c) Backup: Update the Action value Q for actions to track the mean of all evaluations V in the subtree below that action. The Q-value is propagated up to all states that led to a state
d) Play: Once the search is complete, return search probabilities 7 that are proportional to N, where N is the visit count of each move from the root state. Select the move having the highest search probability.

During a Monte-Carlo Tree Search (MCTS) simulation, the algorithm evaluates potential next moves based on both their expected game result, and how much it has already explored them. This is the Polynomial Upper Confidence Bound for Trees, or Max Q+U which is used to walk from the root node to a leaf node. A constant $c_{puct}$ is used to control the trade-off between expected game result and exploration:

PUCT(s, a)=Q(s, a)+U(s, a), where U is calculated as follows:

$$U(s, a) = c_{puct} P(s, a) \frac{\sqrt{\sum_b N(s, b)}}{1 + N(s, a)}$$

Q is the mean action value. This is the average game result across current simulations that took action a.

P is the prior probabilities as fetched from the Neural Network.

N is the visit count, or number of times the algorithm has taken this action during current simulations N(s,a) is the number of times an action (a) has been taken from state (s)

$\Sigma_b$N(s,b) is the total number of times state (s) has been visited during the search The neural network is used to predict the value for each move, i.e. who's ahead and how likely it is to win the game from this position, and the policy, i.e. a probability vector for which move is preferred from the current position (with the aim of winning the game). After a certain number of self-plays the collected tuples state, policy, final game result (s, pi, z) generated by the MCTS are used to train the neural network. The loss function that is used to train the neural network is the sum of the:

- Cross-entropy between the move probability vector (policy output) generated by the neural network and the moves explored by the Monte-Carlo Tree Search.
- Squared difference between the estimated value of a state (value output) and who actually won the game.
- A regularization term.

Figure 4:
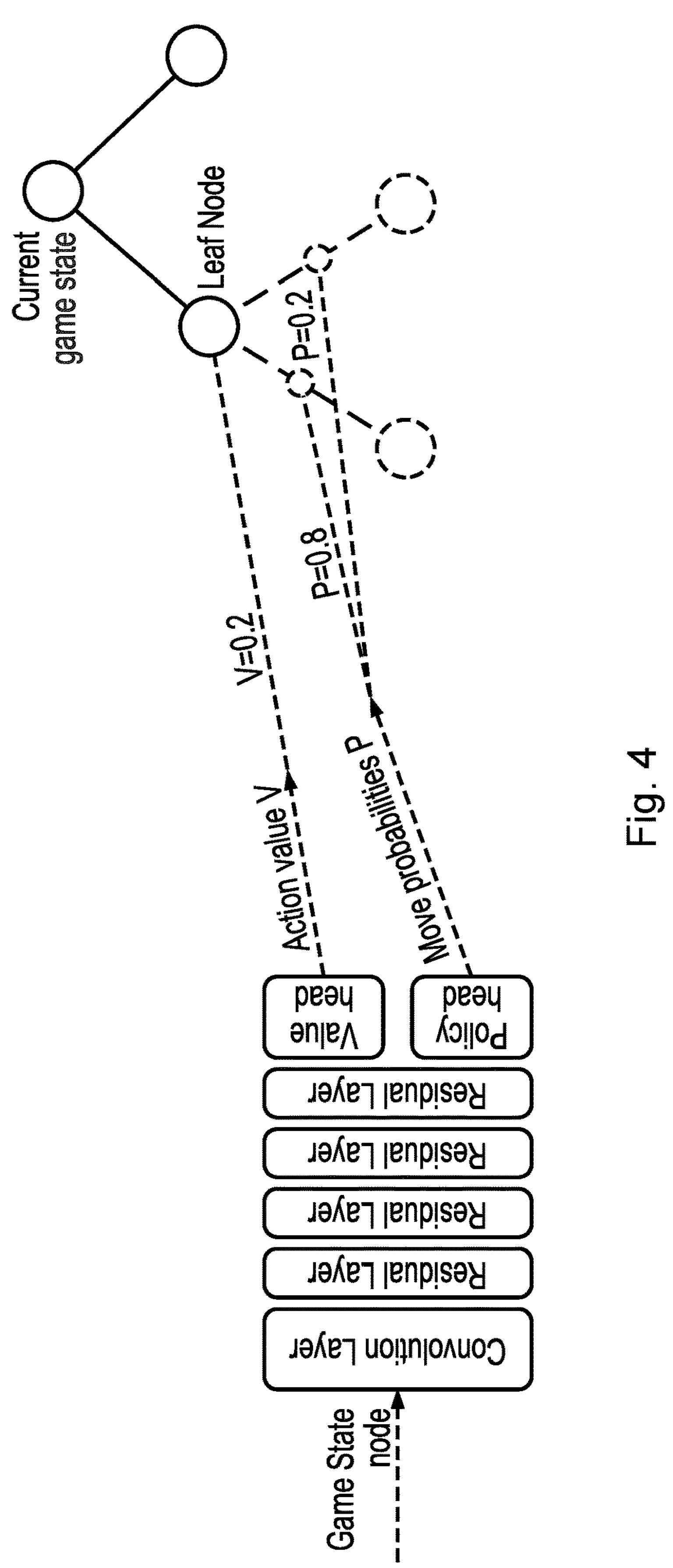
FIG. 4 illustrates use of a Neural Network during self-play.

FIG. 4 illustrates an example of how the neural network is used during self-play. The game state is input to the neural network which predicts both the value of the state (Action value V) and the probabilities of taking the actions from that state (probabilities vector P). The outputs of the neural network are used to guide the MCTS in order to generate the MCTS output probabilities pi, which are used to select the next move in the game.

The AlphaZero algorithm described above is an example of a game play algorithm, designed to select moves in a game, one move after another, adapting to the evolution of the game state as each player implements their selected moves and so changes the overall state of the game. The internal reference document mentioned above proposes to exploit methods that are tailored to such sequential decision making problems by reframing the problem of resource allocation for a scheduling interval, such as a TTI, as a sequential problem, with sequential referring to an approach of "one by one", as discussed above.

Sequential methods such as the AlphaZero algorithm are very powerful for solving problems with a large action space, and the internal reference document mentioned above demonstrates how such a method can be used to address a problem that is not sequential by nature in an efficient manner. It will be appreciated that the AlphaZero algorithm, and the approach of the internal reference document, represent examples of the application of sequential learning algorithms to a problem that is not sequential by nature. Other examples of sequential Reinforcement Learning algorithms can be envisaged for application to such problems.

As discussed above, in the approach to frequency selective scheduling proposed in the internal reference document, considering a scheduling interval sequentially over PRBs and for each allocation of a PRB to a user during live operation, a probability vector is generated by the neural network, and the action with the highest probability is selected resulting in the PRB being mapped to a UE. This procedure needs to be repeated for each PRB, and the number of PRBs may be of the order of 20. The complete resource allocation for all PRBs needs to be performed within one TTI, which may be for example 1/n ms, where n=1 in LTE and n={1, 2, 4, 8} in NR. The time limit is such that there may not be time for the multiple Neural Network (NN) inferences required to allocate all PRBs within the time budget for PRB allocation, and there is consequently a strong incentive to reduce either the time taken for a NN inference and/or the number of NN inferences required. The same issue arises for other cases in which a sequential solution may provide an effective approach to a problem that presents high complexity, large action space, etc., but for which the actions are not necessarily performed in a sequential order, and for which online deployment may require time critical decisions from the NN guiding action selection.

The present disclosure proposes an additional training step that may be performed offline, in which a further NN model is trained that can predict optimal actions, for example optimal resource allocation for all PRBs, in one single NN inference. This "one-shot" NN model encapsulates the learning achieved with the sequential approach but is far faster to run in an online environment, owing to the single inference required. Model distillation may also be used to ensure that the one-shot NN model is as simple and fast to run as possible while still offering the same level of performance that is achieved through sequential application of the multi-shot model. As discussed in further detail below with reference to an example use case, results from prototype testing in frequency selective scheduling show that the resource allocation achieved with a one-shot model trained according to examples of the present disclosure is at least as efficient as that generated by the multi-shot model and sequential approach.

Figure 5A:
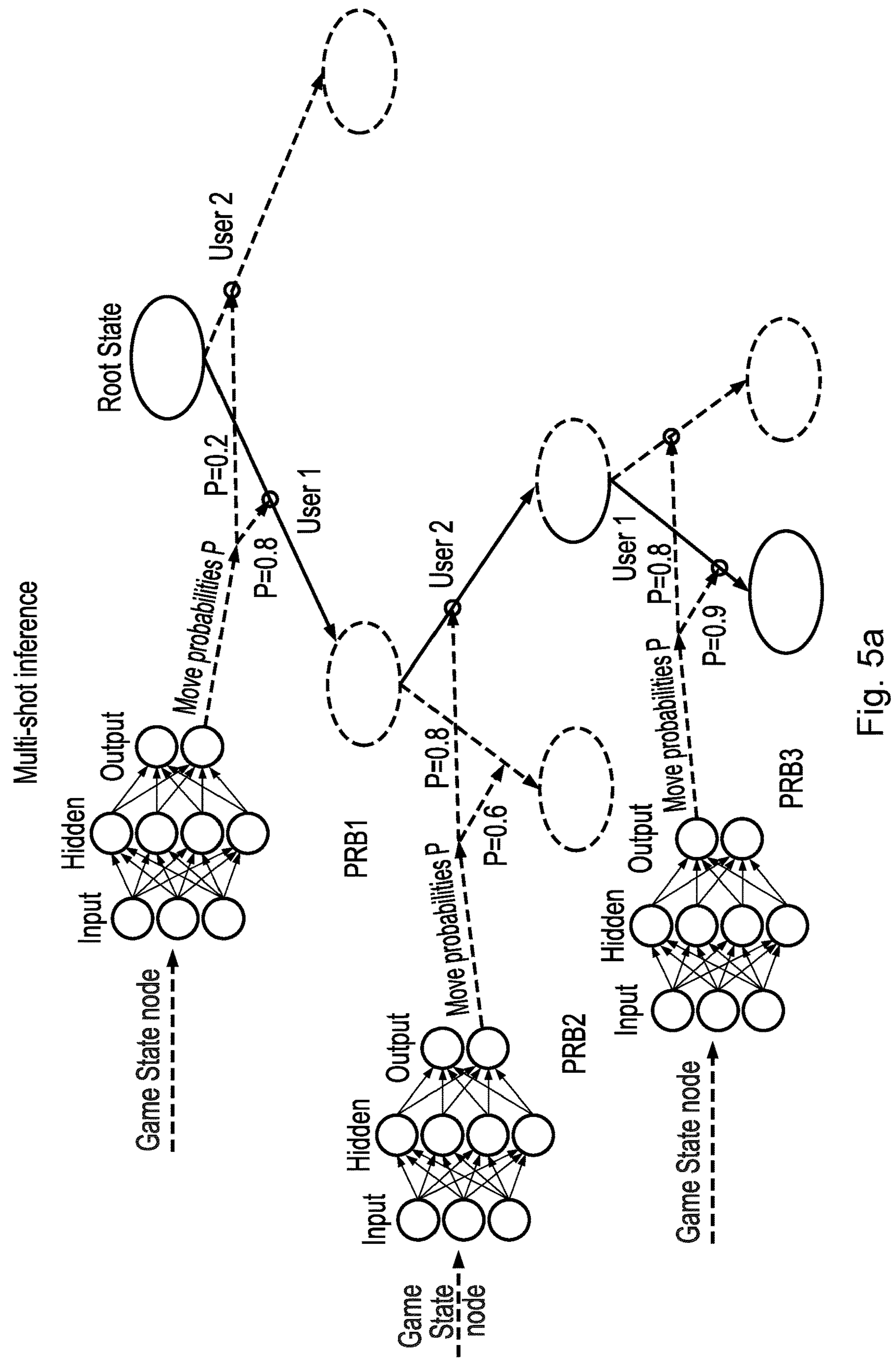
FIGS. 5*a* and 5*b* illustrate the difference between multi-shot and one-shot inference for resource scheduling.
Figure 5B:
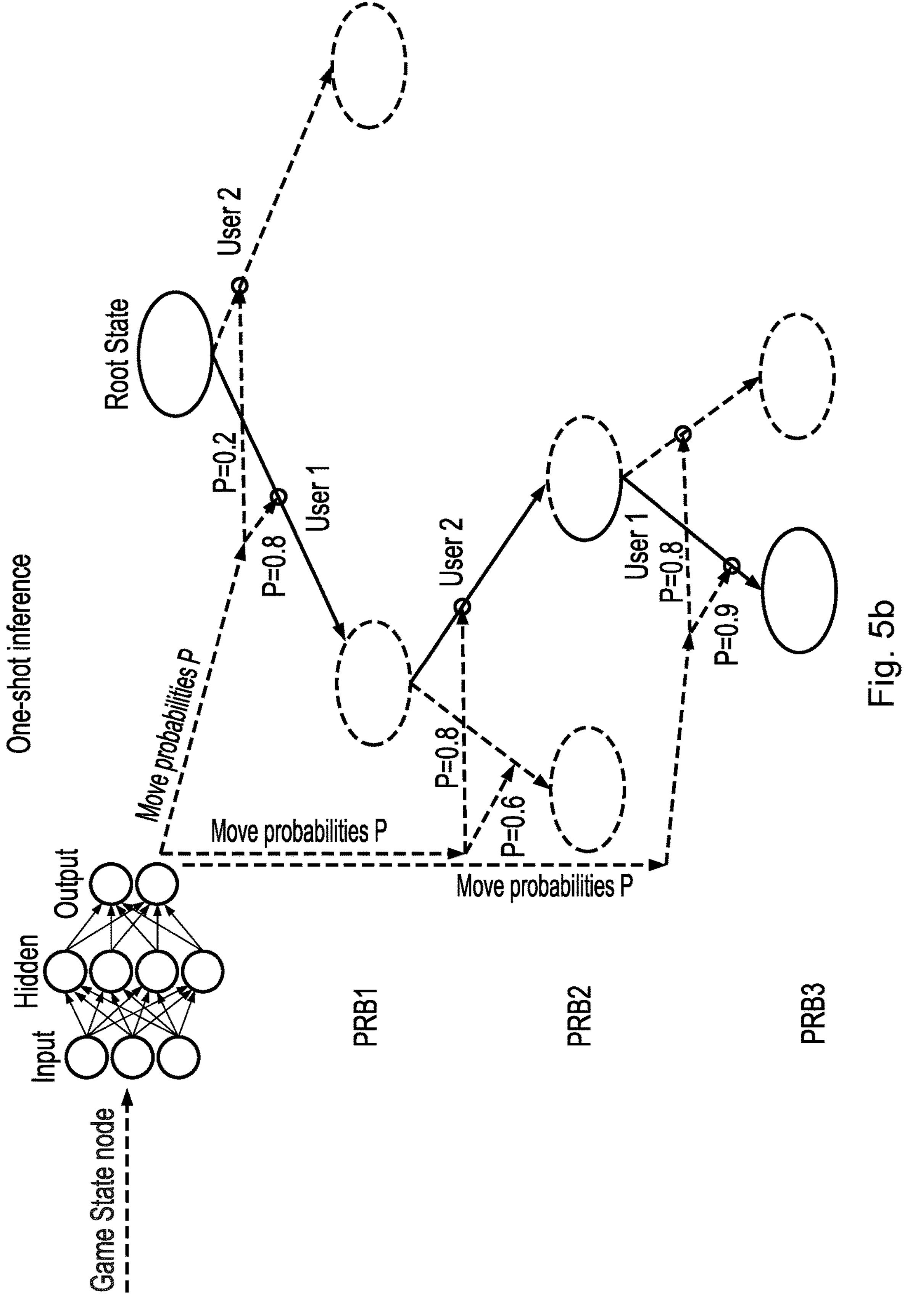

FIGS. 5*a* and 5*b* illustrate the difference between a multi-shot and a one-shot inference for PRB selection for an example situation with 2 UEs and 3 PRBs. As shown in FIG. 5*a*, for a multi-shot approach, three inferences of the NN are required to generate recommendations for resource allocation for all three PRBs. In contrast, as shown in FIG. 5*b*, for a one-shot approach, only a single inference is required to generate recommendations for resource allocation for the three PRBs.

Figure 6:
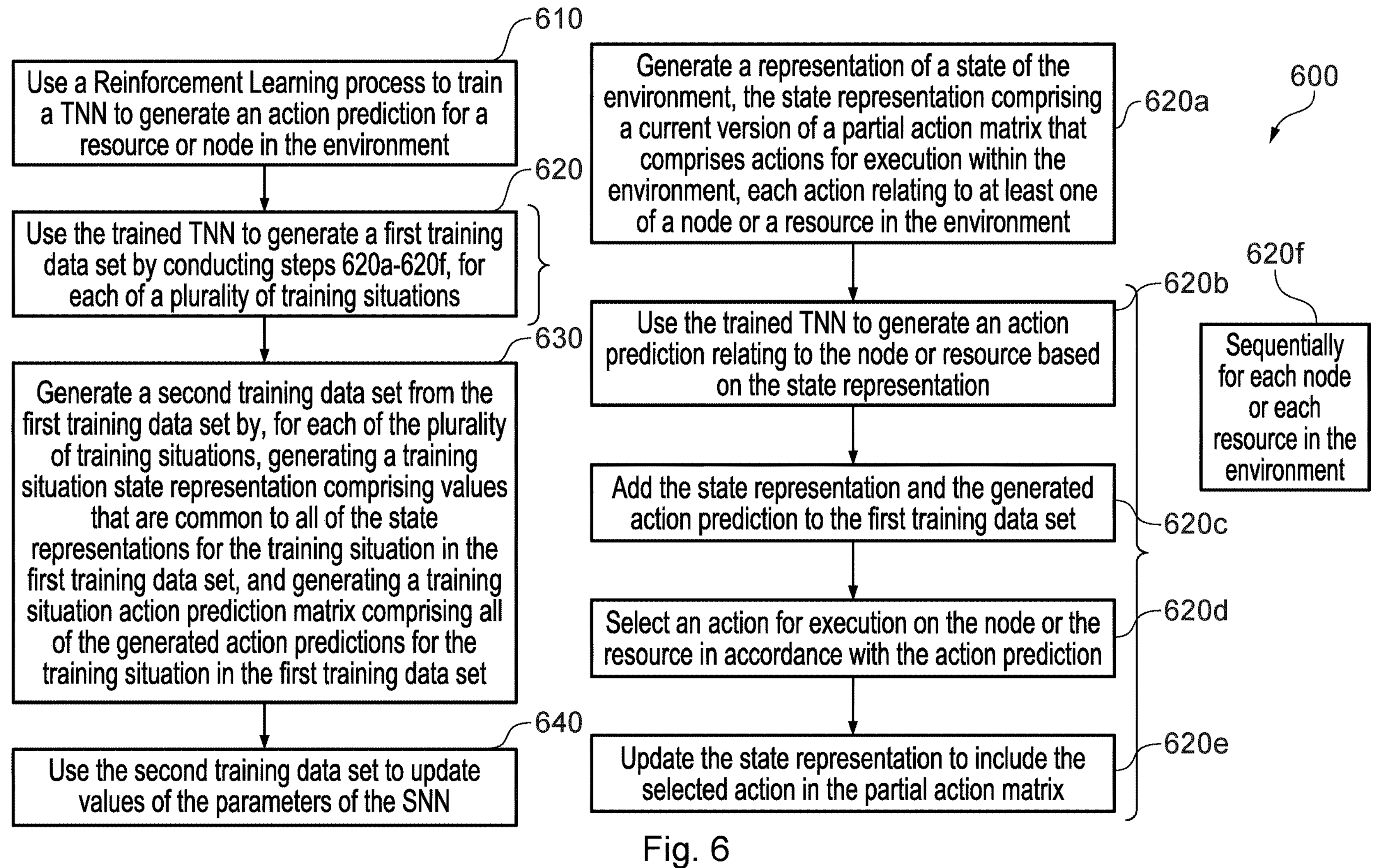
FIG. 6 is a flow chart illustrating process steps in a computer implemented method for training a Student Neural Network.

FIG. 6 is a flow chart illustrating process steps in a computer implemented method 600 for training a Student Neural Network (SNN) having a plurality of parameters, wherein the SNN is for generating an action prediction matrix for an environment in a communication network. The environment comprises a plurality of nodes and a plurality of communication network resources, and the action prediction matrix comprises a plurality of action predictions for actions that may be executed within the environment. Each action prediction of the action prediction matrix relates to at least one of a node or a resource in the environment, and the training performed by the method 600 seeks to ensure that the SNN generates an action prediction matrix that enables selection of optimal or near optimal actions for the environment. The standard of optimal or near optimal may be assessed against one or more success measures for the environment, including communication network throughput, or other network performance parameters or parameter combinations, as discussed below. The method is performed by a training node which may comprise a physical or virtual node, and may be implemented in a server apparatus and/or in a virtualized environment, for example in a cloud or fog deployment. The training node may for example be implemented in a core network of the communication network.

Referring to FIG. 6, the method 600 comprises, in a first step 610, using a Reinforcement Learning (RL) process to train a Teacher Neural Network (TNN) to generate an action prediction for a resource or node in the environment. An environment may for example comprise a communication network cell, a cell sector, a group of cells, or any other collection of nodes and resources within the communication network. As discussed in further detail below, an action prediction relating to a node or resource may comprise an action prediction vector, each element of the action prediction vector corresponding to a possible action for the node or resource, and comprising a probability that the corresponding action is the most favourable of the possible actions according to a success measure for the environment. The success measure may relate to performance of a task by the environment, such as provision of communication network services and may comprise a function of one or more performance parameters for the communication network.

In step 620, the method 600 comprises using the trained TNN to generate a first training data set. Sub steps involved in the generation of the first training data set are illustrated at steps 620*a* to 620*f*, and generating the first training data set at step 620 comprises repeating steps 620*a* to 620*f* for each of a plurality of training situations. Step 620*a* comprises generating a representation of a state of the environment, the state representation comprising a current version of a partial action matrix that comprises actions for execution within the environment, each action relating to at least one of a node or a resource in the environment. A partial action matrix may for example comprise a matrix representation of nodes or resources in the environment and possible actions that may be executed on the nodes or resources, together with, for each node or resource for which an action has been selected, an indication of the selected action. In one example, with nodes or resources represented as matrix rows, and possible actions as matrix columns, a partial action matrix may initially comprise an all zero matrix, and may be updated to include a 1 in an element to indicate that the corresponding action has been selected for the corresponding node or resource.

Following generation of the state representation at 620*a*, generating a first data set for a given training situation comprises performing steps 620*b* to 620*e* sequentially for each node or each resource in the environment, as illustrated at 620*f*. Step 620*b* comprises using the trained TNN to generate an action prediction relating to the relevant node or resource based on the state representation. Step 620*c* comprises adding the state representation and the generated action prediction to the first training data set. Step 620*d* comprises selecting an action for execution on the node or the resource in accordance with the action prediction. Step 620*e* comprises updating the state representation to include the selected action in the partial action matrix. Additional detail relating to the generation of the first training data set at step 620 is discussed below with reference to FIG. 7*d*.

Referring still to FIG. 6, following generation of the first training data set, the method 600 comprises, at step 630, generating a second training data set from the first training data set. This may be considered as a transformation of the first training data set, retaining and combining certain elements of the first training data set to arrive at the second training data set. As illustrated at step 630, generating the second training data set comprises, for each of the plurality of training situations, generating a training situation state representation comprising values that are common to all of the state representations for the training situation in the first training data set. Generating the second training data set further comprises, for each of the plurality of training situations, generating a training situation action prediction matrix comprising all of the generated action predictions for the training situation in the first training data set. It will be appreciated that the step 630 of generating the second training data set encompasses "one-shot" transformation, by removing sequential elements of the state representation (retaining only elements that are common to all representations for the situation) and combining the action predictions of each multi-shot inference into an action prediction matrix. The step 630 of generating the second training data set also encompasses ideas from neural network model distillation, as it is the action predictions, and not the selected actions, that are retained for inclusion in the second training data set.

Finally, in step 640, the method 600 comprises using the second training data set to update values of the parameters of the SNN. In this manner, the SNN is trained to encapsulate the learning of the TNN, via the first training data set that was generated using the trained TNN and formed the basis of the second training data set used to train the SNN. It will be appreciated that the parameters of the SNN whose values are updated in step 640 are the trainable parameters (i.e. the weights) of the SNN, as opposed to the hyperparameters.

The method 600 in effect combines multi-shot training with one shot inference, enabling the training of a time efficient one-shot model for inference that nonetheless incorporates learning gained using the exploration of a large action space that is offered by sequential algorithms.

In some examples, a simulated environment may be used to perform the training of the TNN and the generation of the first data set. The first data set is generated by conducting steps 620*a* to 620*f* for a plurality of training situations. The precise details of a training situation will depend on the nature of the environment, the particular nodes and resources under consideration and the available actions for the nodes and resources. A training situation may be thought of as a particular problem. For example, for a resource allocation use case, a training situation would be resource allocation for a cell over one TTI; for Remote Electronic Tilt (RET), the training situation would be RET settings for a plurality of cells over a time interval, etc. For the purpose of the present disclosure, it will be appreciated that the definition of "nodes" comprised within an environment of a communication network encompasses Radio Access Network nodes, Core network nodes, and user devices, or UEs that are connected to the communication network. Thus, a communication network comprises nodes which may be part of the communication network architecture (RAN nodes, Core nodes etc.), as well as nodes which may be user devices connected to the communication network. An environment of a communication network may comprise one or more RAN nodes, one or more Core network nodes, one or more UEs, or a combination of such nodes, according to the definition of the environment and the use case for which examples of the present disclosure are to be applied. For example, an environment comprising a single communication network cell or cell sector, appropriate for a frequency selective scheduling use case, may comprise communication network nodes in the form of UEs within the coverage area of the cell or cell sector. An environment comprising a plurality of communication network cells, appropriate for a RET or DL power setting use case, may comprise communication network nodes in the form of the RAN nodes serving the cells. For the purposes of the present specification, a RAN node of a communication network comprises a node that is operable to transmit, receive, process and/or orchestrate wireless signals. A RAN node may comprise a physical node and/or a virtualised network function. In some examples, a RAN node may comprise a NodeB, eNodeB, gNodeB, Remote Radio Head (RRH), Base Band Unit (BBU), etc. A RAN node may additionally comprise any combination of functionality provided by such elements.

FIGS. 7*a* to 7*g* show flow charts illustrating another example of a computer implemented method 700 for training a SNN having a plurality of parameters, wherein the SNN is for generating an action prediction matrix for an environment in a communication network. As for the method 600 discussed above, the environment comprises a plurality of nodes and a plurality of communication network resources, and the action prediction matrix comprises a plurality of action predictions for actions that may be executed within the environment. Each action prediction of the action prediction matrix relates to at least one of a node or a resource in the environment, and the training performed by the method 700 seeks to ensure that the SNN generates an action prediction matrix that enables selection of optimal or near optimal actions for the environment. The standard of optimal or near optimal may be assessed against one or more success measures for the environment, including communication network throughput, or other network performance parameters or parameter combinations, as discussed below. The method 700 is performed by a training node which may comprise a physical or virtual node, and may be implemented in a server apparatus and/or in a virtualized environment, for example in a cloud or fog deployment. The training node may for example be implemented in a core network of the communication network. In further examples, the training node may be implemented outside of the communication network, for example be on large clusters of Central Processing Units (CPUs), and hardware specialized for neural network training (such as for example Graphics Processing Units (GPUs)). Clusters of CPUs and GPUs can offer extensive computation resources specialised for neural network training and parallel execution. The method 700 illustrates examples of how the steps of the method 600 may be implemented and supplemented to provide the above discussed and additional functionality.

Figure 7A:
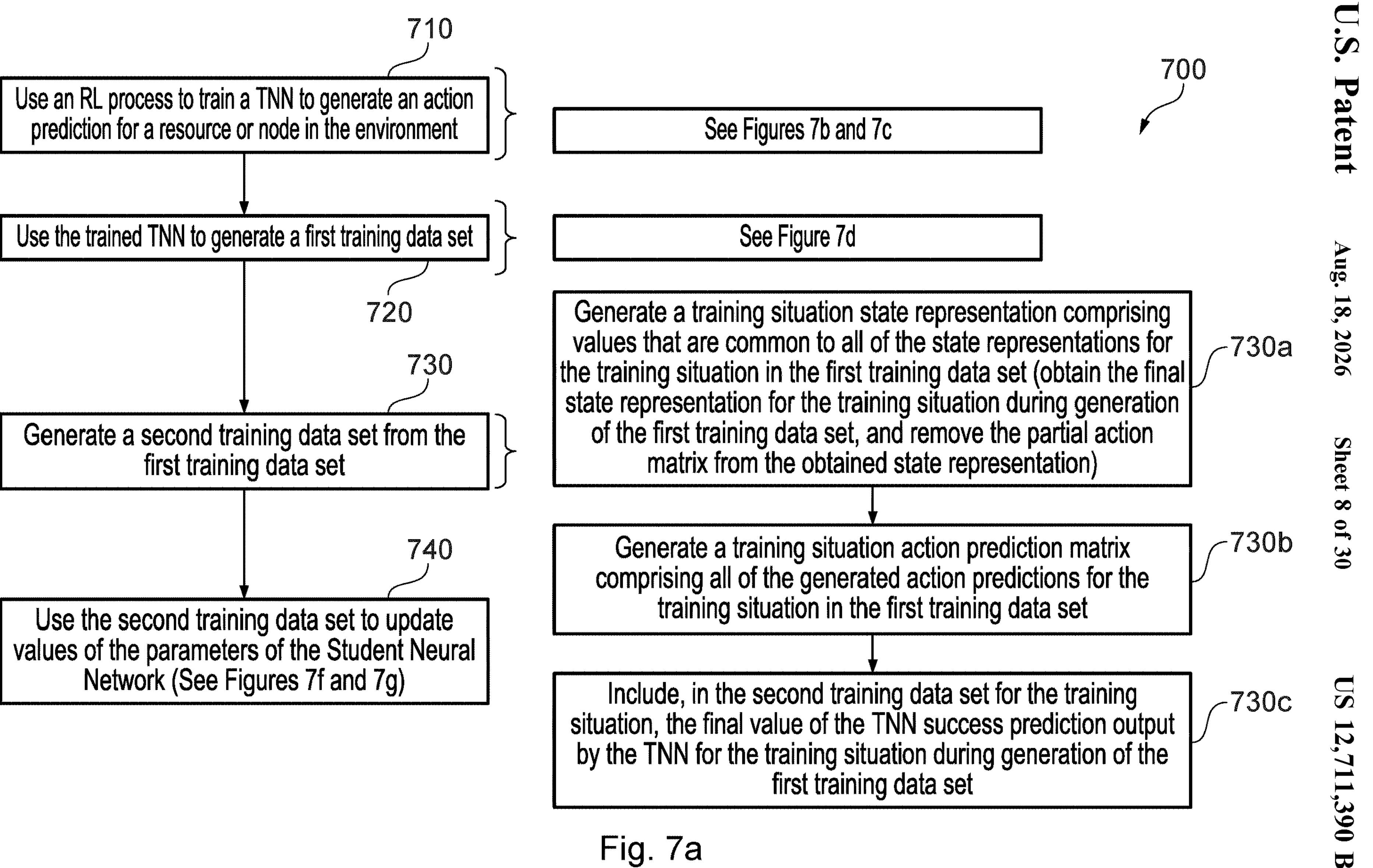
FIGS. 7*a* to 7*g* show flow charts illustrating another example of a computer implemented method for training a Student Neural Network.

Referring initially to FIG. 7*a*, according to the method 700, in a first step 710, the training node carrying out the method uses a Reinforcement Learning (RL) process to train a TNN to generate an action prediction for a resource or node in the environment. Steps that may be involved in the training at step 710 are illustrated in FIGS. 7*b* and 7*c* and described in further detail below.

A wide range of RL processes may be envisaged for training the TNN in step 710. Examples of suitable RL process include MCTS-based RL (AlphaZero etc.), Deep Q-learning, Asynchronous Advantage Actor-Critic (A3C), Proximal Policy Optimization (PPO), Trust Region Policy Optimization (TRPO), Deep Deterministic Policy Gradient (DDPG), and others. FIGS. 7*b* and 7*c* illustrate process steps in two example approaches to using an RL process to train the TNN.

Figure 7B:
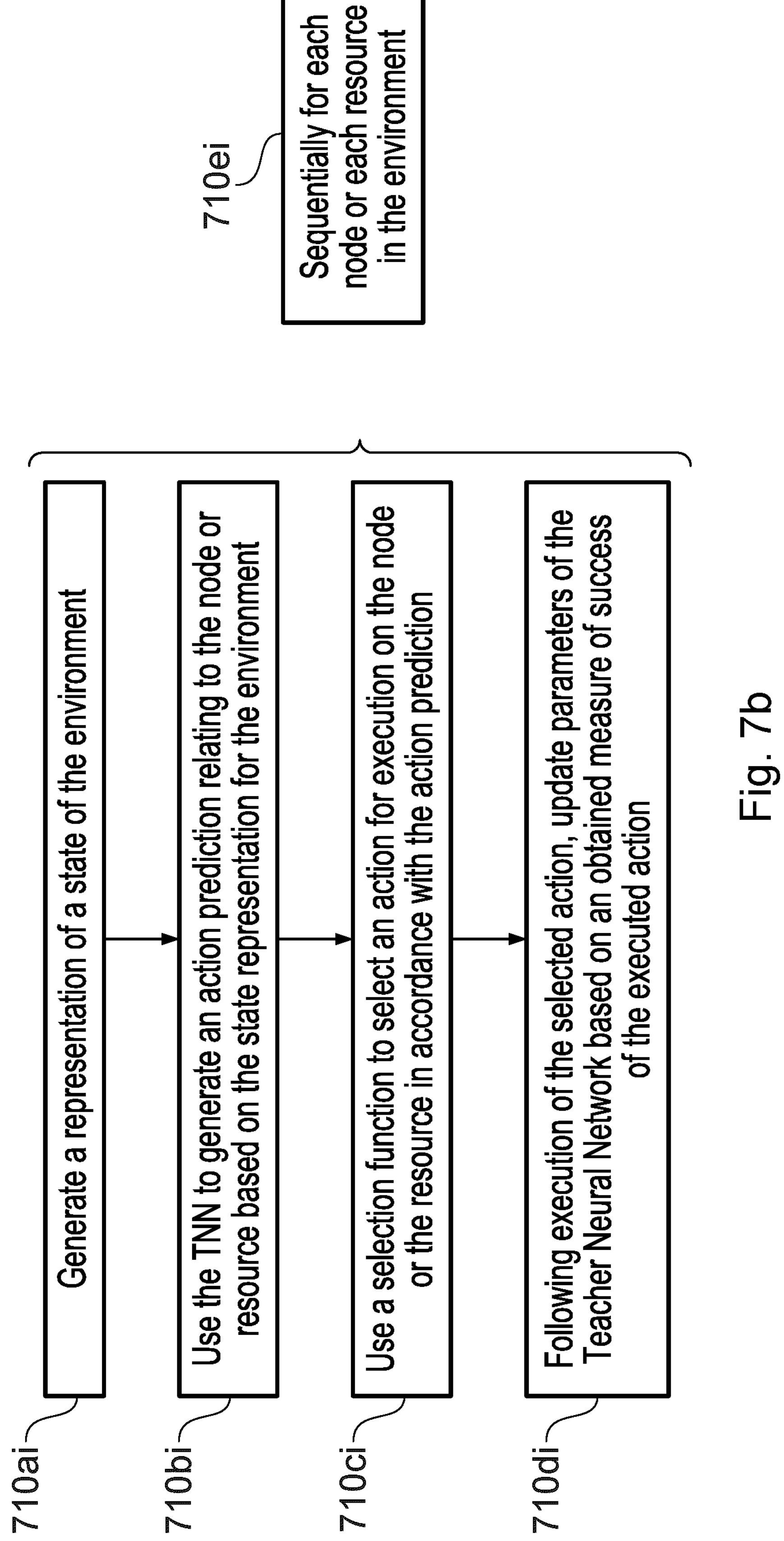

Referring initially to FIG. 7*b*, in one option for using an RL process, the training node performs steps 710*ai* to 710*di* sequentially for each node or each resource in the environment, as illustrated in step 710*ei*. In step 710*ai*, the training node generates a representation of a state of the environment. This may comprise a vector or matrix of values of parameters representative of the environment state. In step 710*bi*, the training node uses the TNN to generate an action prediction relating to the node or resource under consideration based on the state representation for the environment. As discussed above, an action prediction may comprise an action prediction vector, each element of the action prediction vector corresponding to a possible action for the node or resource, and comprising a probability that the corresponding action is the most favourable of the possible actions according to a success measure for the environment. In step 710*ci*, the training node uses a selection function to select an action for execution on the node or the resource in accordance with the action prediction. Following execution of the selected action, the training node then updates parameters of the TNN based on an obtained measure of success of the executed action in step 710*di*. As discussed above, the process of FIG. 7*b* may be performed offline and for example in a simulated environment.

Figure 7C:
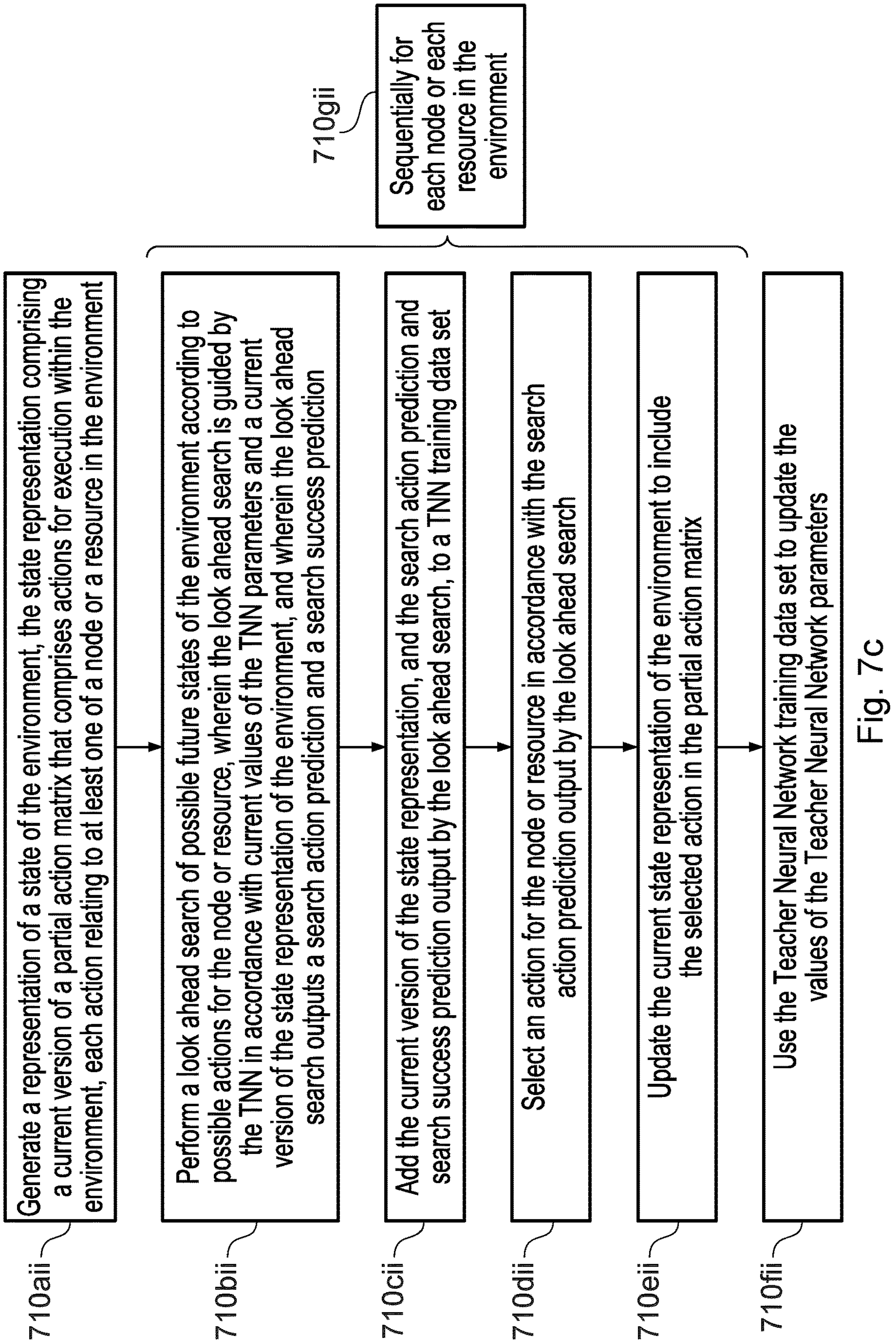

FIG. 7*c* illustrates an alternative option for using an RL process to train the TNN. The option of FIG. 7*c* incorporates elements of look ahead search with RL, as discussed above and disclosed in an unpublished internal reference document. Referring to FIG. 7*c*, the training node first generates a representation of a state of the environment in step 710*aii*, the state representation comprising a current version of a partial action matrix that comprises actions for execution within the environment, each action relating to at least one of a node or a resource in the environment. As discussed above, a partial action matrix may for example comprise a matrix representation of nodes or resources in the environment and possible actions that may be executed on the nodes or resources, together with, for each node or resource for which an action has been selected, an indication of the selected action. In one example, with nodes or resources represented as matrix rows, and possible actions as matrix columns, a partial action matrix may initially comprise an all zero matrix, and may be updated to include a 1 in an element to indicate that the corresponding action has been selected for the corresponding node or resource.

Following step 710*aii*, the training node then performs steps 710*bii* to 710*eii* sequentially, for each node or each resource in the environment as illustrated at 710*gii*. In step 710*bii*, the training node performs a look ahead search of possible future states of the environment according to possible actions for the node or resource, wherein the look ahead search is guided by the TNN in accordance with current values of the TNN parameters and a current version of the state representation of the environment, and wherein the look ahead search outputs a search action prediction and a search success prediction. The look ahead search may for example comprise Monte Carlo Tree Search (MCTS) as discussed above. In step 7101*cii*, the training node adds the current version of the state representation, and the search action prediction and search success prediction output by the look ahead search, to a TNN training data set. In step 710*dii*, the training node selects an action for the node or resource in accordance with the search action prediction output by the look ahead search, and, in step 710*eii*, the training node updates the current state representation of the environment to include the selected action in the partial action matrix. Having carried out steps 710*bii* to 710*eii* sequentially for each node or each resource in the environment, the training node then uses the TNN training data set to update the values of the TNN parameters (i.e. the TNN weights) in step 710*fii*.

In some examples, the training node may then repeat all of steps 710*aii* to 710*fii* using the newly updated parameters of the TNN. In this manner, the training node may alternate generation of data for a TNN training data set, and updating of TNN parameters using the TNN training data set, until a termination condition is satisfied. The termination condition may comprise a threshold number of iterations, a threshold measure of performance for the TNN, etc. As for the TNN training illustrated in FIG. 7*b*, the process of FIG. 7*c* may be performed offline and for example in a simulated environment.

Referring again to FIG. 7*a*, in step 720, following training of the TNN, the training node uses the trained TNN to generate a first training data set. Steps that may be involved in the generation of the first training data set at step 720 are illustrated in FIG. 7*d* and FIG. 7*e*, and are described in further detail below.

Figure 7D:
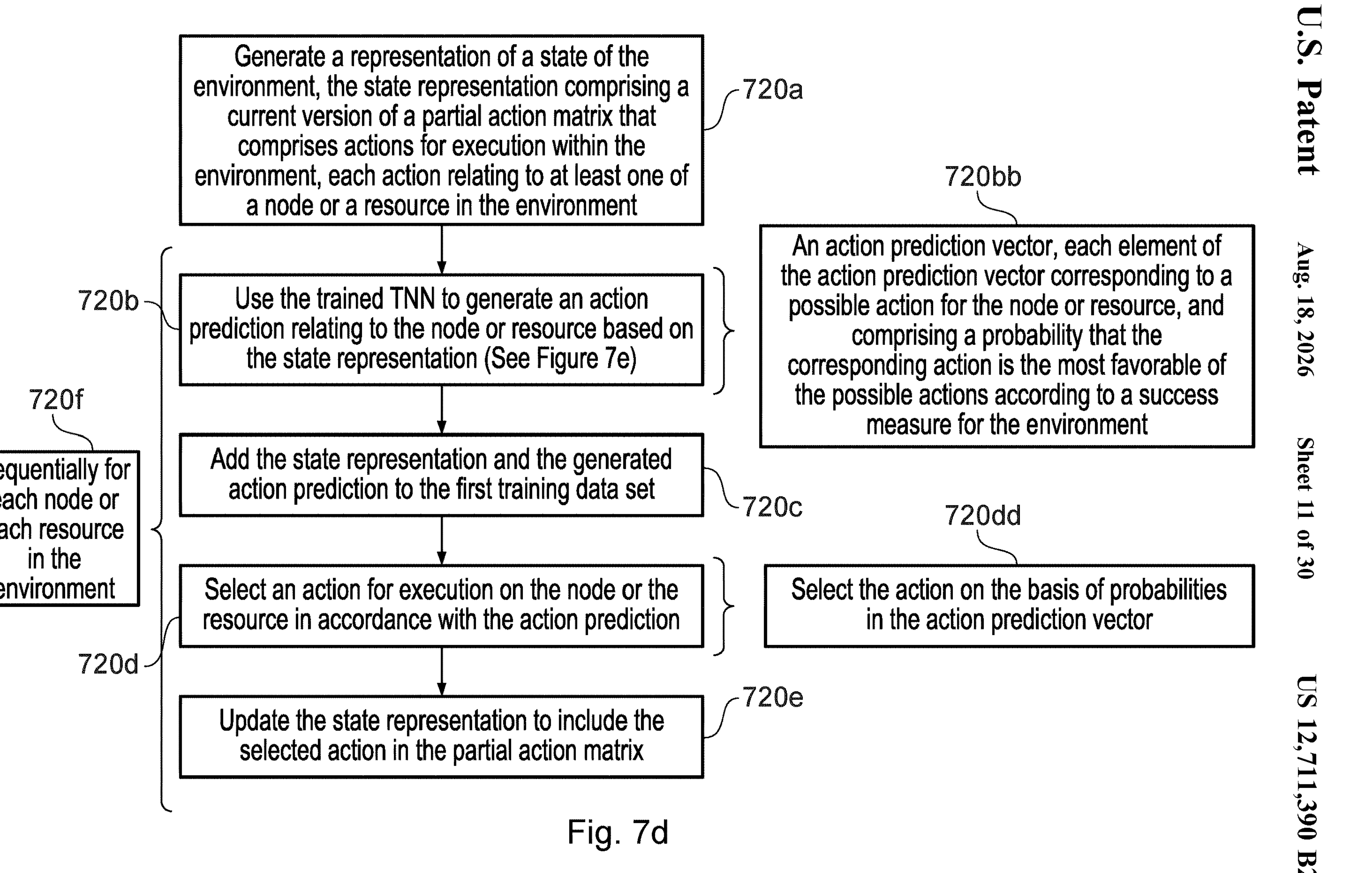
Figure 7E:
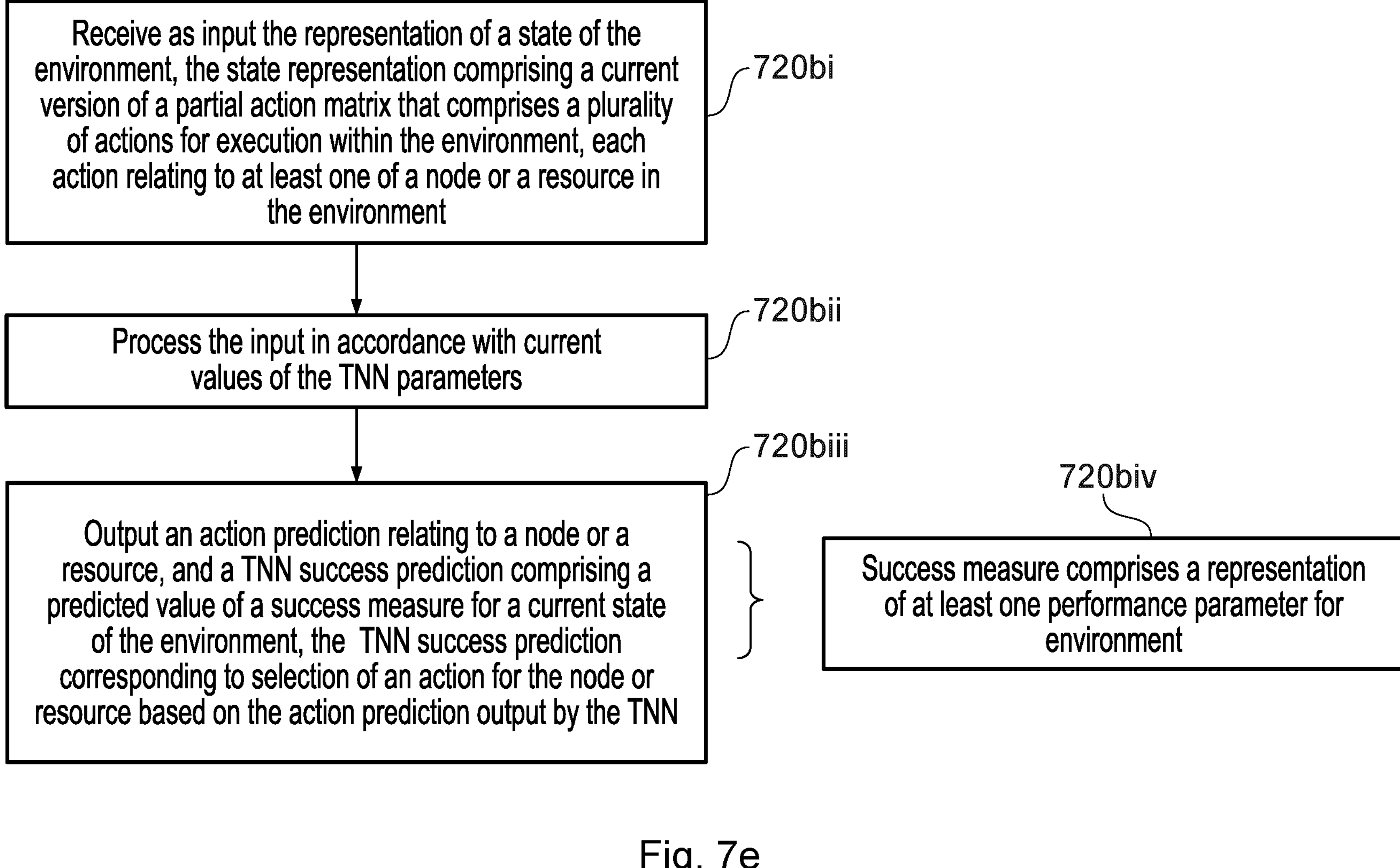

Referring now to FIG. 7*d*, using the trained TNN to generate a first training data set may comprise performing steps 720*a* to 720*f* for each of a plurality of training situations. As discussed above, the precise details of a training situation will depend on the nature of the environment, the particular nodes and resources under consideration and the available actions for the nodes and resources. A training situation may be thought of as a particular problem. For example, for a resource allocation use case, a training situation would be resource allocation for a cell over one TTI; for Remote Electronic Tilt (RET), the training situation would be RET settings for a plurality of cells over a time interval, etc.

In step 720*a*, the training node first generates a representation of a state of the environment, the state representation comprising a current version of a partial action matrix that comprises actions for execution within the environment, each action relating to at least one of a node or a resource in the environment. The training node then performs steps 720*b* to 720*e* sequentially, for each node or each resource in the environment. This may comprise for example selecting a first node or resource, performing steps 720*b* to 720*e* with respect to the selected node or resource, and then selecting another node or resource that has not yet been selected, performing steps 720*b* to 720*e* for the newly selected node, etc. until steps 720*b* to 720*e* have been performed with respect to all nodes or all resources for consideration in the environment.

In step 720*b*, the training node uses the trained TNN to generate an action prediction relating to the relevant (i.e. the currently selected) node or resource based on the state representation. As discussed above, and as illustrated at 720*bb*, an action prediction relating to a node or resource may comprise an action prediction vector, each element of the action prediction vector corresponding to a possible action for the node or resource, and comprising a probability that the corresponding action is the most favourable of the possible actions according to a success measure for the environment. The success measure may relate to performance of a task by the environment, such as provision of communication network services, and may for example comprise a function of one or more network performance parameters. Steps that may be carried during use of the TNN to generate an action prediction are illustrated in FIG. 7*e*, and described in further detail below.

Referring now to FIG. 7*e*, the TNN may be configured to receive as input at step 720*bi* the representation of a state of the environment, the state representation comprising a current version of a partial action matrix that comprises a plurality of actions for execution within the environment, each action relating to at least one of a node or a resource in the environment. The TNN may be further configured to process the input at step 720*bii* in accordance with current values of the TNN parameters. In step 720*bii*i, the TNN may be configured to output an action prediction relating to a node or a resource, and to output a TNN success prediction comprising a predicted value of a success measure for a current state of the environment, the TNN success prediction corresponding to selection of an action for the node or resource based on the action prediction output by the TNN. The predicted value of the success measure may therefore comprise the predicted value in the event that an action is selected in accordance with the action prediction output by the TNN. As illustrated at 720*biv*, the success measure may comprise a representation of at least one performance parameter for environment. The success measure may for example comprise a combined representation of a plurality of performance parameters for the environment, one or more of which may be user specific performance parameters. In some examples, a success measure for the environment may be selected by a network operator or administrator, for example in accordance with operational priorities.

Referring again to FIG. 7*d*, after using the TNN to generate an action prediction relating to a node or resource, the training node then, in step 720*c*, adds the state representation, the generated action prediction, and the generated TNN success prediction, to the first training data set. In step 720*d*, the training node selects an action for execution on the node or the resource in accordance with the action prediction, for example by selecting the action on the basis of probabilities in the action prediction vector. As illustrated at 720*dd*, during an exploitation phase, this may comprise selecting the action corresponding to the highest probability in the action prediction vector. During a training or exploration phase, actions with lower probabilities may be selected according to the PUCT algorithm discussed above. In step 720*e*, the training node updates the state representation to include the selected action in the partial action matrix. As discussed above and illustrated in step 720*f*, the training node may then repeat steps 720*b* to 720*e* sequentially for each node or resource in the environment. Also as discussed above, all of steps 720*a* to 720*f* may be performed for each of a plurality of training situations to generate the first training data set.

Referring again to FIG. 7*a*, having generated the first training data set, the training node then, in step 730, generates a second training data set from the first training data set. This may be considered as a transformation of the first training data set, retaining and combining elements of the first training data set to form the second training data set, and discarding other elements of the first training data set. Generating the second training data set may comprise performing steps 730*a* to 730*c* for each of the plurality of training situations represented in the first training data set, as illustrated in FIG. 7*a*. In step 730*a*, the training node first generates a training situation state representation for a training situation. The training situation state representation comprises values that are common to all of the state representations for the training situation in the first training data set. As illustrated at 730*a*, in one example this may be performed by obtaining the final state representation for the training situation during generation of the first training data set, and removing the partial action matrix from the obtained state representation. The example illustrated in step 730*a* assumes that the only element of the state representation that varies between representations for the training situation in the first training data set is the partial action matrix, all other elements remaining the same throughout the "multi-shot" application of the TNN to the training situation. In step 730*b*, the training node generates a training situation action prediction matrix comprising all of the generated action predictions for the training situation in the first training data set. This may comprise simply assembling all of the action prediction vectors into an action prediction matrix that consequently comprises action predictions for the training situation for each of the nodes or resources in the environment. In step 730*c*, the training node includes, in the second training data set for the training situation, the final value of the TNN success prediction output by the TNN for the training situation during generation of the first training data set.

As discussed above, generation of the second training data set from the first training data set has the effect of transforming the first training data set from a "multi-shot" training data set to a "one-shot" training data set by assembling all of the action predictions into a single action prediction matrix per training situation, by removing any elements of the state representation for a training situation that are not common to the entire training situation, and by including only the final value of the TNN success prediction for the training situation. Generation of the second training data set from the first training data set also incorporates model distillation, allowing for use of a smaller and more efficient SNN, as the action predictions are included into an action prediction matrix, and the SNN is thus trained to reproduce the entire action predictions of the TNN, and not just to guide selection of the same most favourable actions.

Referring still to FIG. 7*a*, in step 740 the training node uses the second training data set to update values of the parameters of the SNN. A discussed above, the SNN is for generating an action prediction matrix for the environment, the action prediction matrix comprising a plurality of action predictions for actions that may be executed within the environment. Each action prediction of the action prediction matrix relates to at least one of a node or a resource in the environment, and the training performed by the method 600 seeks to ensure that the SNN generates an action prediction matrix that enables selection of optimal or near optimal actions for the environment. The action predictions of the action prediction matrix may each comprise action prediction vectors, wherein each element of an action prediction vector corresponds to a possible action for the node or resource to which the action prediction vector relates, and comprises a probability that the corresponding action is the most favourable of the possible actions according to a success measure for the environment.

Figure 7F:
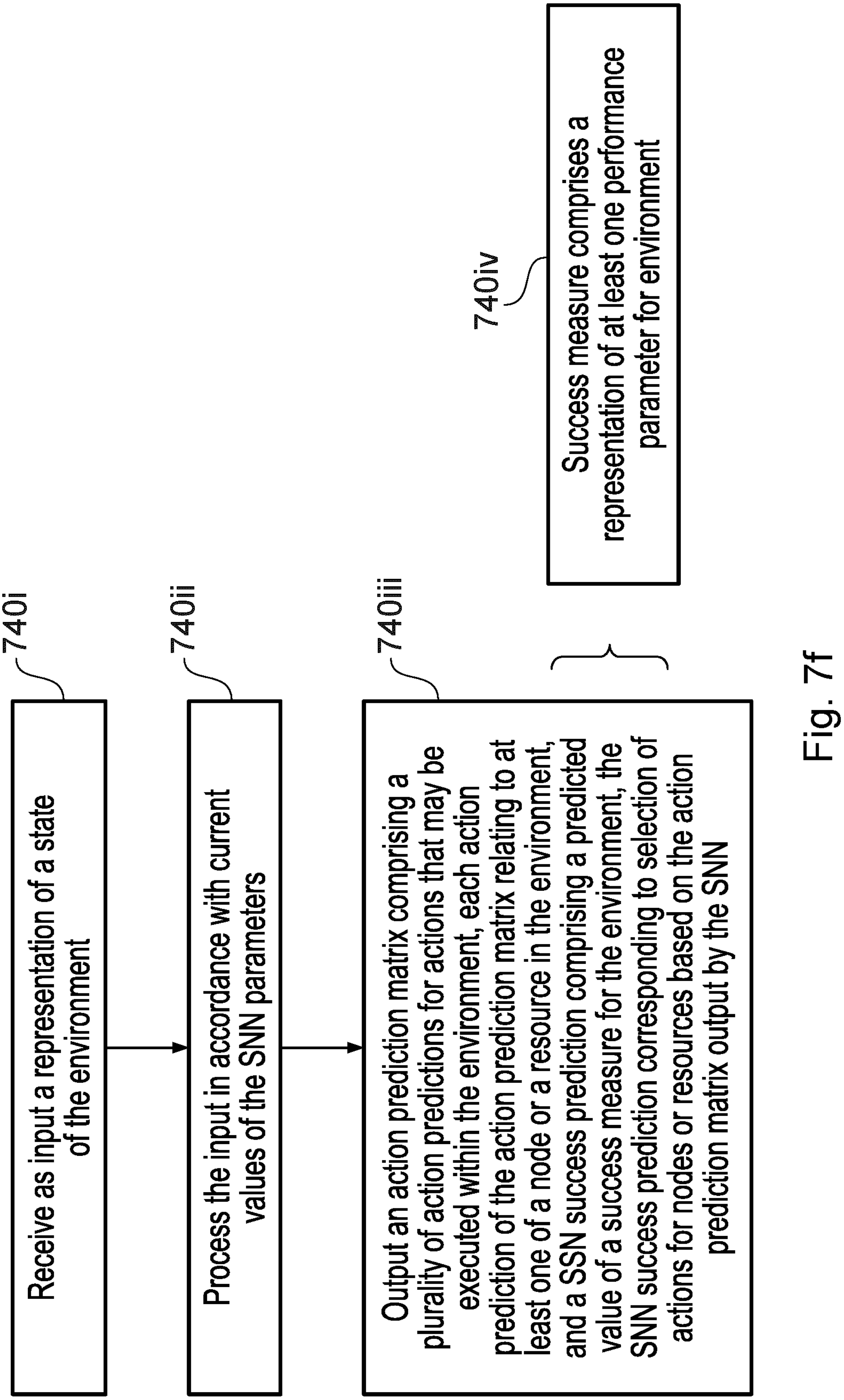
Figure 7G:
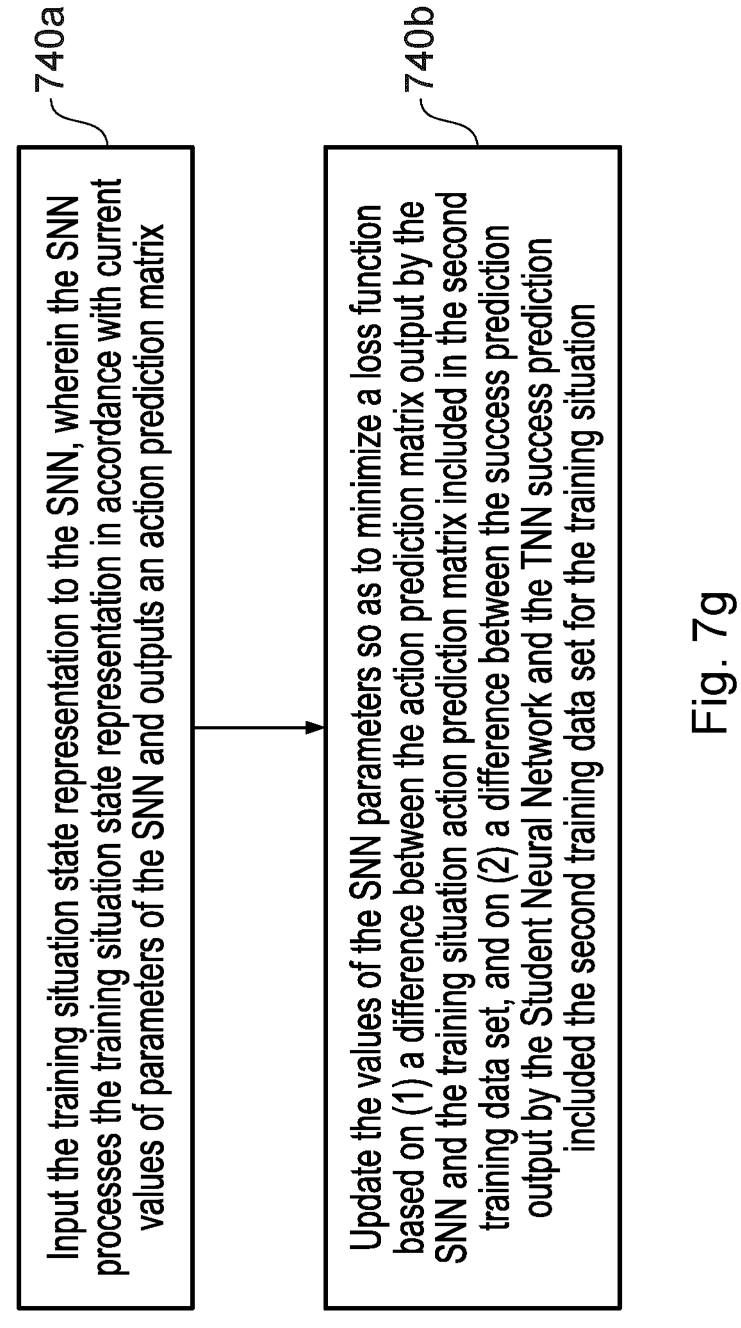

Steps that may be carried out during use of the SNN to generate an action prediction matrix are illustrated in FIG. 7*f*, and steps that may be carried out in using the second training data set to update values of the parameters of the SNN at step 740 are illustrated in FIG. 7*g*.

Referring now to FIG. 7*f*, the SNN may be configured to receive as input at step 740*i* a representation of a state of the environment, and to process the input in accordance with current values of the SNN parameters at step 740*ii*. In step 740*iii*, the SNN may be configured to output an action prediction matrix comprising a plurality of action predictions for actions that may be executed within the environment, each action prediction of the action prediction matrix relating to at least one of a node or a resource in the environment. The SNN may also be configured to output an SNN success prediction comprising a predicted value of a success measure for the environment, the success prediction corresponding to selection of actions for nodes or resources based on the action prediction matrix output by the SNN. As discussed above with reference to operation of the TNN, the success measure may comprise a representation of at least one performance parameter for environment, and the predicted value of the success measure may comprise the predicted value in the event that actions for nodes or resources are selected in accordance with the action prediction matrix output by the SNN.

It will be appreciated that the steps illustrated in FIG. 7*f* highlight the "one-shot" operation of the SNN, which outputs an action prediction matrix comprising action predictions for a plurality of nodes or resources, and contrasts this with the "multi-shot" operation of the TNN, which outputs an action prediction for a single node or resource and is illustrated in FIG. 7*e*.

Referring now to FIG. 7*g*, using the second training data set to update the values of the SNN may comprise carrying out steps 740*a* and 740*b* for training situations in the second training data set. In step 740*a*, the training node inputs a training situation state representation to the SNN, wherein the SNN processes the training situation state representation in accordance with current values of parameters of the SNN and outputs an action prediction matrix, and may also output an SNN success prediction. The training node then updates the values of the SNN parameters in step 740*b* so as to minimise a loss function based on a difference between the action prediction matrix output by the SNN and the training situation action prediction matrix included in the second training data set. The loss function may also be based on a difference between the SNN success prediction output by the SNN and the TNN success prediction included the second training data set for the training situation (which may have been the final TNN success prediction of the training situation generated by the TNN).

It will be appreciated that a range of different use cases may be envisaged for the methods 600, 700, according to which the communication network environment, environment state representation, possible actions, etc. may take different forms. FIGS. 8*a* to 8*d* illustrate some example options for the methods 600, 700 according to different use cases, as well as an example implementation of the methods to a particular use case.

Figure 8A:
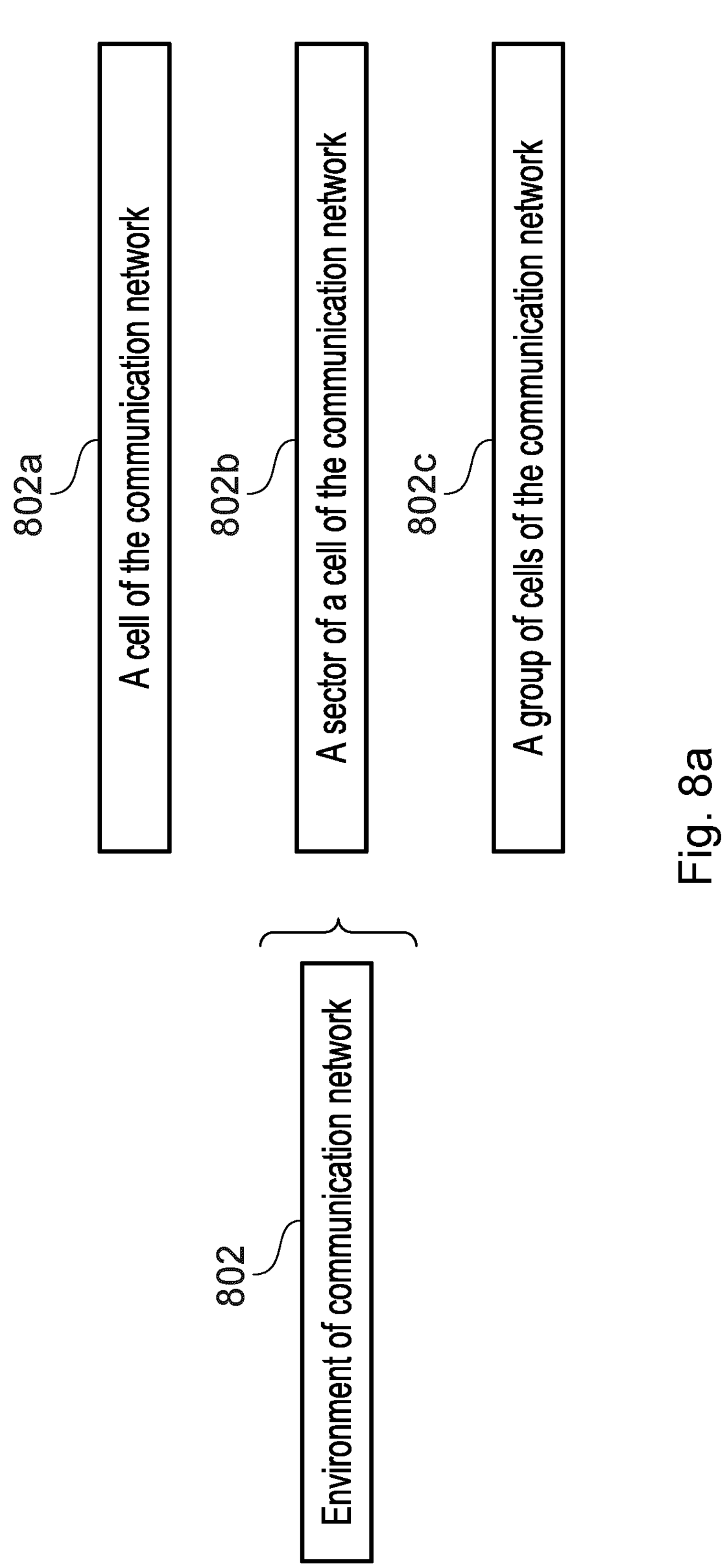

Referring initially to FIG. 8*a*, the environment 802 of the communication network may comprise at least one of a cell of the communication network 802*a*, a sector of a cell of the communication network 802*b*, and/or a group of cells of the communication network 802*c*.

The representation of a current environment state that is generated according to the methods 600, 700 may comprise parameter values for suitable parameters according to the particular environment. FIG. 8*b* illustrates example elements that may be included in the representation 804 of the environment state for an environment comprising a region of a communication network, a cell of a communication network, a cell sector of a communication network, a group of cells of a communication network, etc. The example elements include:

a value of a network coverage parameter 804*a*
a value of a network capacity parameter 804*b*
a value of a network congestion parameter 804*c*
a current network resource allocation 804*d*
a current network resource configuration 804*e*
a current network usage parameter 804*f*
a current network parameter of a neighbour communication network cell 804*g*
a value of a network signal quality parameter 804*h*
a value of a network signal interference parameter 804*i*
a value of a network power parameter 804*j*
a current network frequency band 804*k*
a current network antenna down-tilt angle 8041
a current network antenna vertical beamwidth 804*m*
a current network antenna horizontal beamwidth 804*n*
a current network antenna height 804*o*
a current network geolocation 804*p*
a current network inter-site distance 804*q*.

Figure 8C:
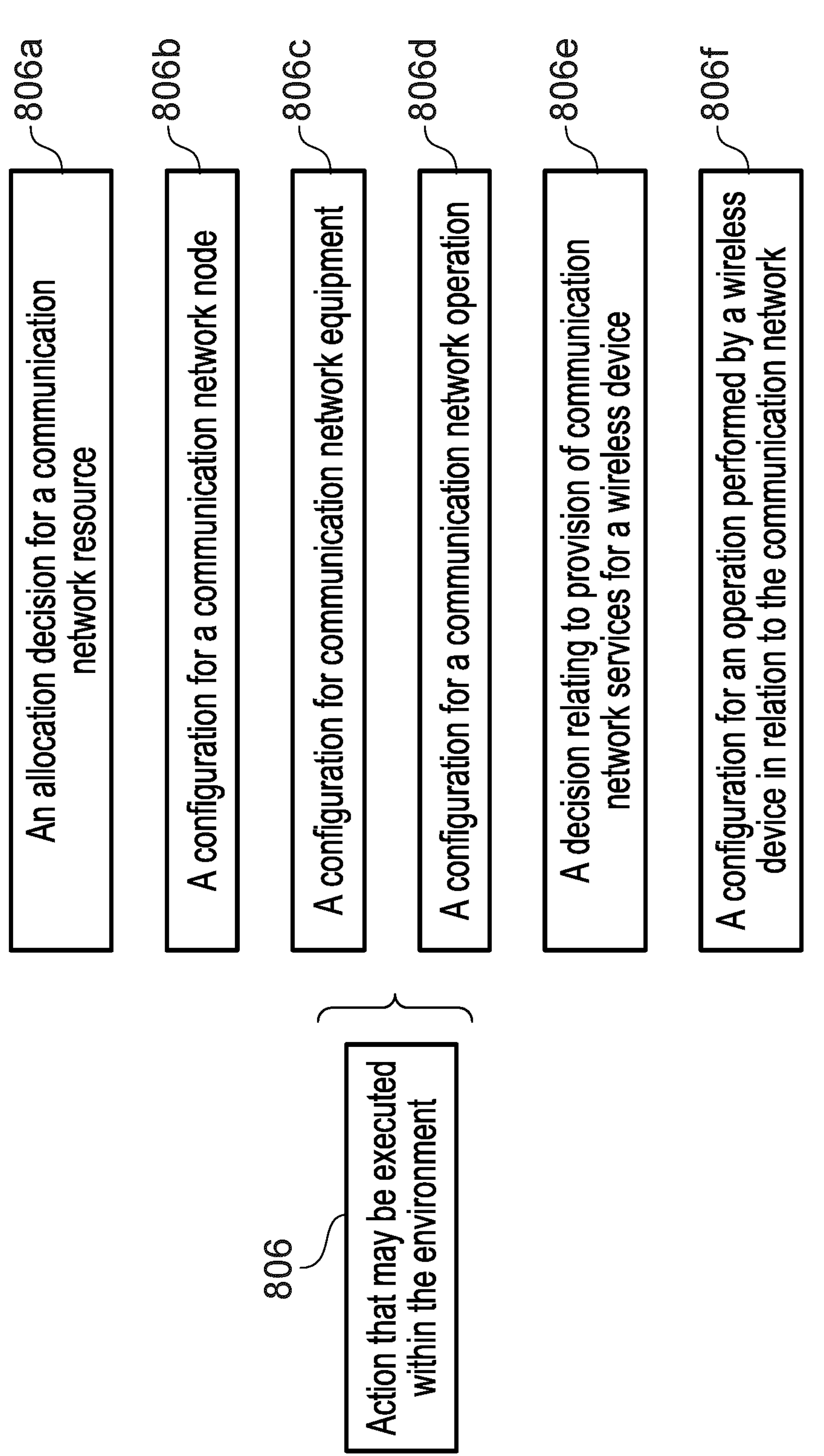

Example actions 806 that may be executed within the environment are illustrated in FIG. 8*c* and include:

- an allocation decision for a communication network resource 806*a*
- a configuration for a communication network node 806*b*
- a configuration for communication network equipment 806*c*
- a configuration for a communication network operation 806*d*
- a decision relating to provision of communication network services for a wireless device 806*e*
- a configuration for an operation performed by a wireless device in relation to the communication network 806*f*.

Figure 8D:
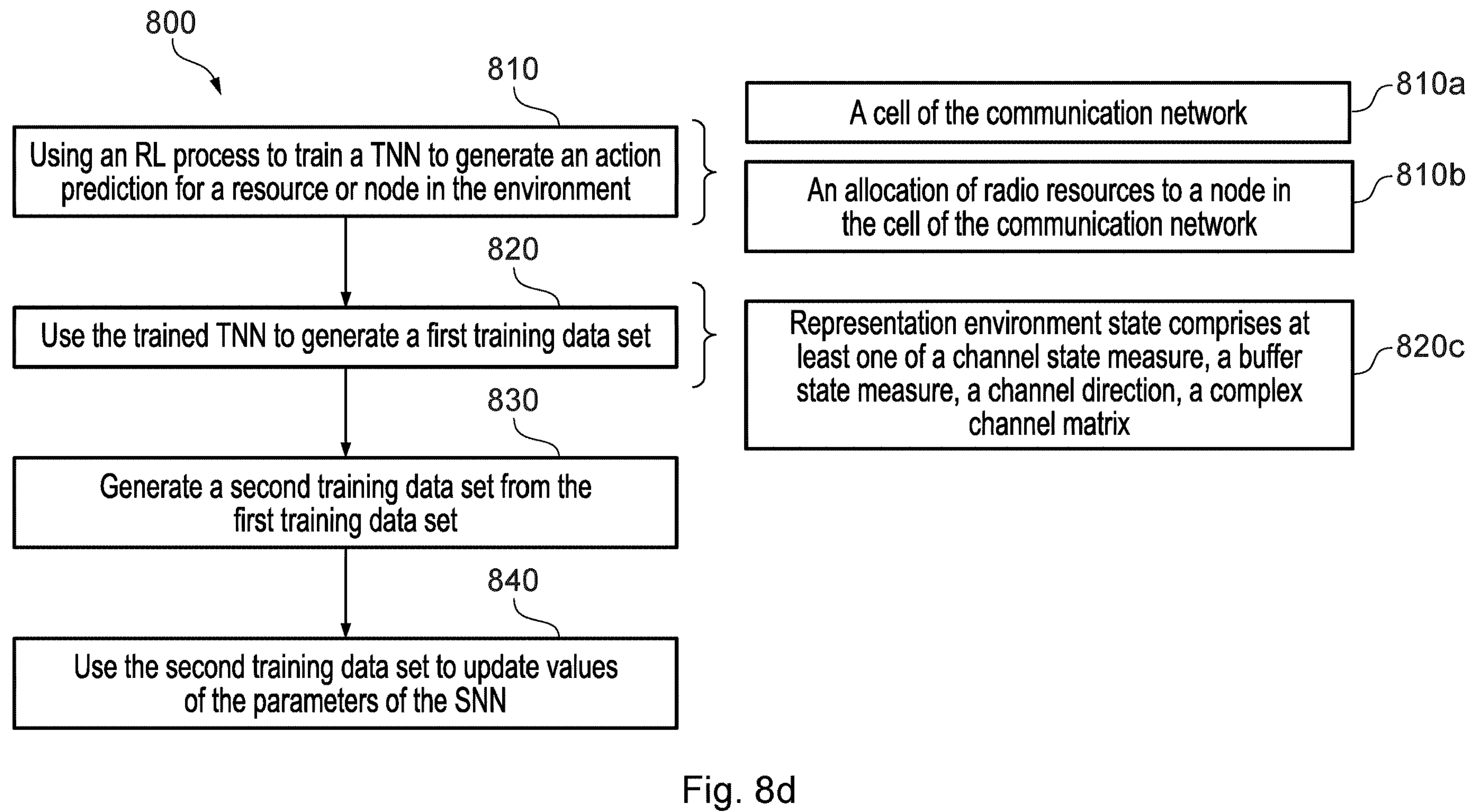

FIG. 8*d* illustrates an example application of the method 600 to the problem of allocation of communication network resources to nodes in an environment comprising a cell of the communication network. Referring to FIG. 8*d*, in a first step 810, the training node uses an RL process to train a TNN to generate an action prediction for a resource or node in the environment. As illustrated at 810*a*, the environment comprises a cell of the communication network. As illustrated at 810*b*, an action that may be executed within the environment comprises an allocation of radio resources to a node in the cell of the communication network.

In step 820, the training node uses the trained TNN to generate a first training data set as set out above with reference to FIGS. 6 and 7*a* to 7*g*. As discussed above, this comprises, inter alia, generating a representation of a state of the cell of the communication network, and, as illustrated at 820*c*, the representation may comprise a range of different elements. The representation of a current state of the communication network cell may comprise at least one of:

- a channel state measure for each node requesting allocation of cell radio resources during an allocation episode (such as a TTI), and for radio resources of the cell that are available for allocation during the allocation episode;
- a buffer state measure for each node requesting allocation of cell radio resources during the allocation episode;
- a channel direction of each node requesting allocation of cell radio resources during the allocation episode and radio resources of the cell that are available for allocation during the allocation episode; and/or
- a complex channel matrix of each node requesting allocation of cell radio resources during the allocation episode and radio resources of the cell that is available for allocation during the allocation episode.

Referring still to FIG. 8*d*, in step 830, the training node generates a second training data set from the first training data set, and in step 840 the training node uses the second training data set to update values of the parameters of the SNN. Each of these steps is described in detail above.

The methods 600, 700, and 800 may be complimented by methods 900, 1000 performed by a management node, in which the trained SNN is used in management of an environment of a communication network.

Figure 9:
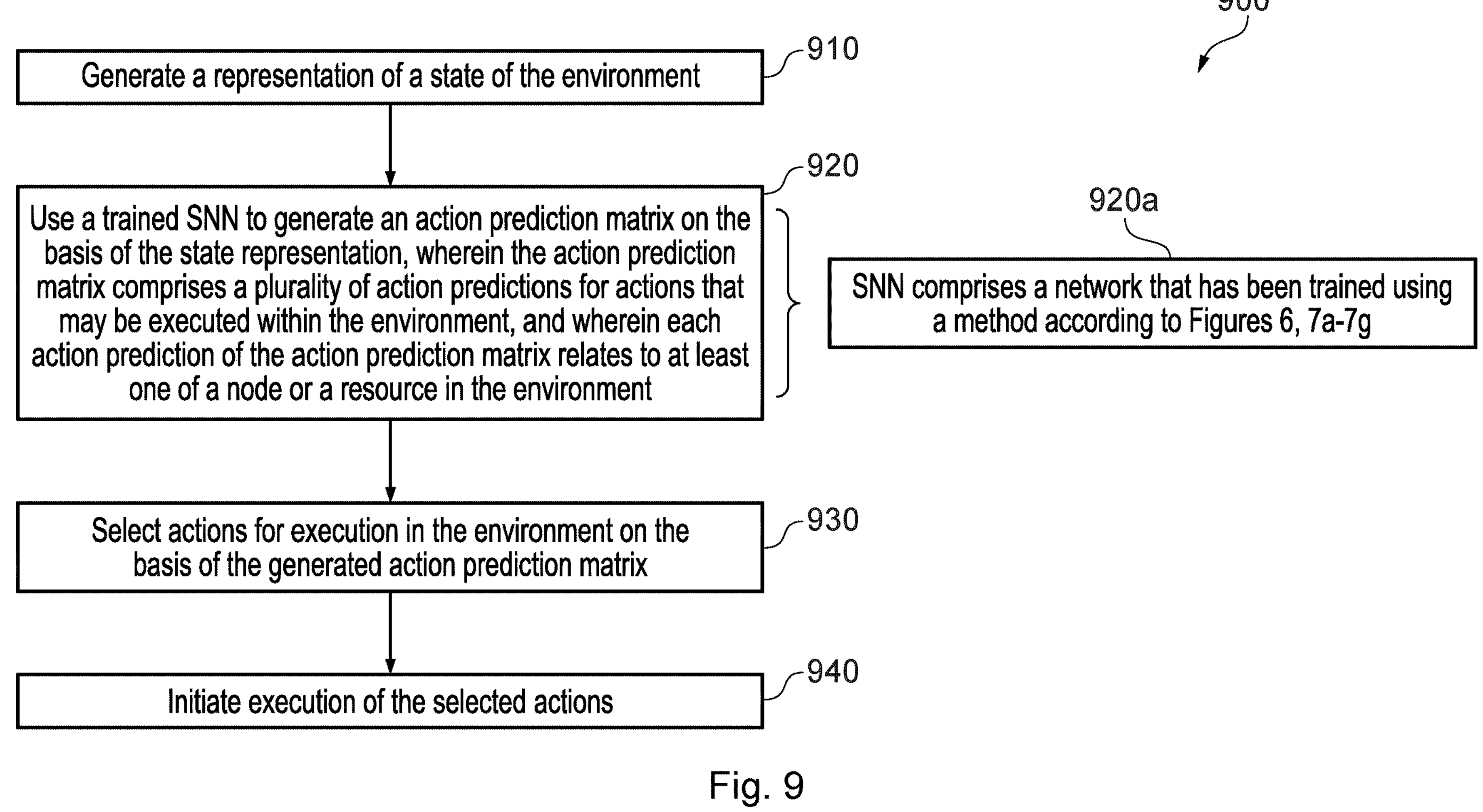
FIG. 9 is a flow chart illustrating process steps in a computer implemented method for managing an environment within a communication network.

FIG. 9 is a flow chart illustrating process steps in a computer implemented method 900 for managing an environment within a communication network, the environment comprising a plurality of nodes and a plurality of communication network resources. The method is performed by a management node which may comprise a physical or virtual node, and may be implemented in a server apparatus and/or in a virtualized environment, for example in a cloud or fog deployment. The management node may comprise or be instantiated in any part of a logical core network node, network management centre, network operations centre, Radio Access Network node etc. Any such communication network node may itself be divided between several logical and/or physical functions, and any one or more parts of the management node may be instantiated in one or more logical or physical functions of a communication network node. A Radio Access Network Node may comprise a base station, eNodeB, gNodeB, or any other current of future implementation of functionality facilitating the exchange of radio network signals between nodes and/or users of a communication network.

Referring to FIG. 9, the method 900 comprises, in a first step 910, generating a representation of a state of the environment. In step 920, the method 900 comprises using a trained Student Neural Network (SNN) to generate an action prediction matrix on the basis of the state representation, wherein the action prediction matrix comprises a plurality of action predictions for actions that may be executed within the environment, and wherein each action prediction of the action prediction matrix relates to at least one of a node or a resource in the environment. As illustrated at 920*a*, the SNN has been trained using a method according to examples of the present disclosure, such as the methods 600, 700 and/or 800. In step 930 the method 900 comprises selecting actions for execution in the environment on the basis of the generated action prediction matrix. Finally, in step 940, the method 900 comprises initiating execution of the selected actions.

It will be appreciated that much of the detail described above with reference to the methods 600, 700 and 800 also applies to the method 900. For example, the nature of the environment, the elements that may be included in the state representation, the operation of the SNN, the details of the action prediction matrix generated by the SNN, etc. may all be substantially as described above with reference to FIGS. 6 to 8*d*. Selection of actions for execution in the environment on the basis of the generated action prediction matrix at step 930 may consequently comprise selecting, in an exploitation phase and for each node or resource, the action corresponding to the highest probability in the row or column of the action prediction matrix that is associated with that node or resource.

It will also be appreciated that by virtue of having been trained using a method according to the present disclosure, the SNN of the method 900 embodies all of the learning afforded by a sequential exploration of a large action space, despite only requiring a single inference to guide selection of actions for multiple nodes or resources in the environment.

The method 900 may in some examples be for managing the communication network environment during a time period comprising a plurality of time intervals, and the method 900 may consequently further comprise repeating steps 910 to 940 for each of the plurality of time intervals. The time intervals may correspond to a TTI (for resource scheduling), or to any other time interval appropriate to a particular use case.

As noted above, a range of possible use cases can be envisaged for the method 900, and examples of such use cases are discussed more fully below. Reference is made to FIGS. 8*a* to 8*c* and the accompanying description for a discussion of examples of environment, state representation, and actions which may also be applicable to the method 900.

Figure 10:
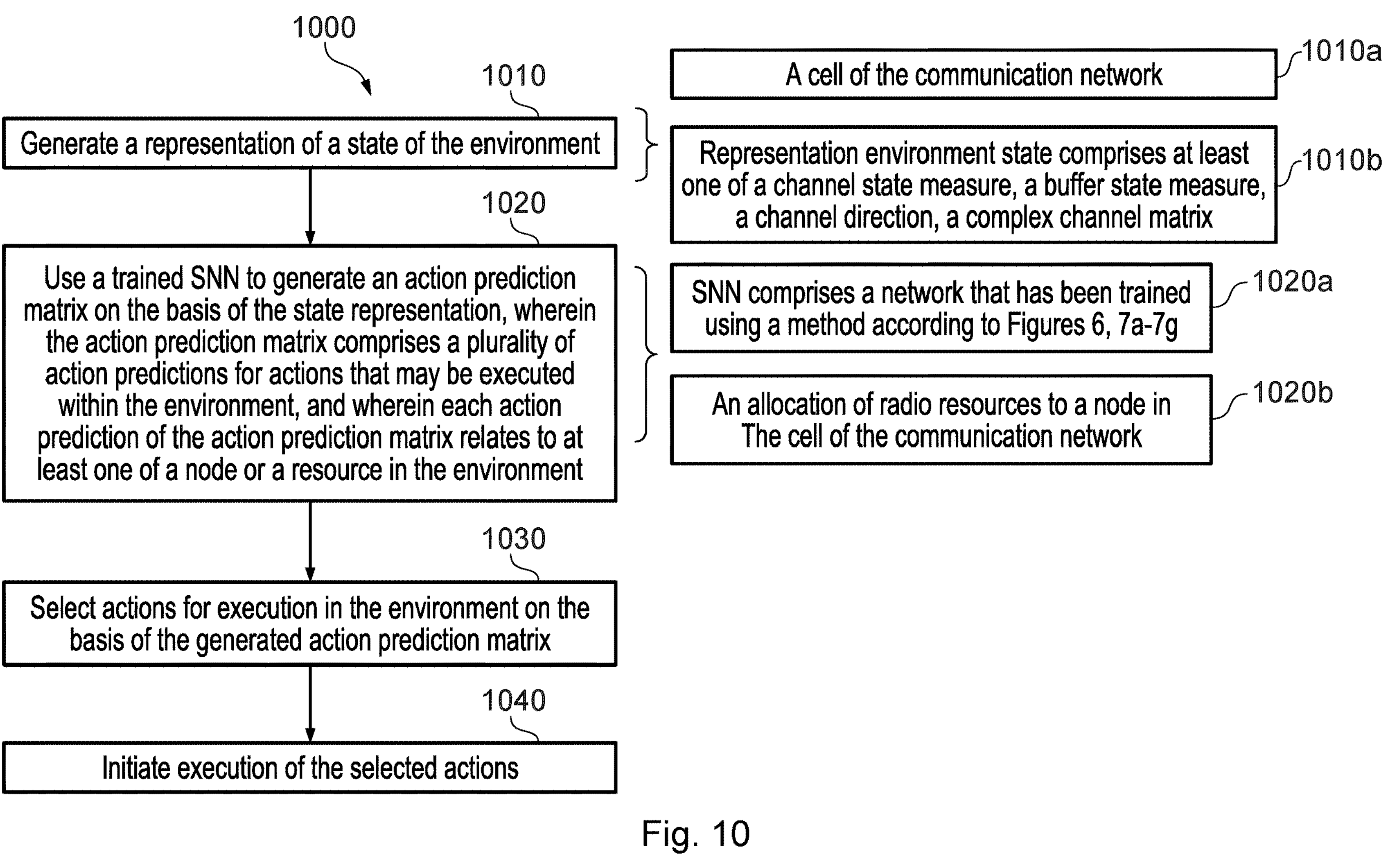
FIG. 10 illustrates an example application of the method of FIG. 9 to the problem of allocation of communication network resources.

FIG. 10 illustrates an example application of the method 900 to the problem of allocation of communication network resources to nodes in an environment comprising a cell of the communication network. The method 1000 of FIG. 10 thus corresponds to the method 800 of FIG. 8*d*. Referring to FIG. 10, in a first step 1010, the management node generates a representation of a state of the environment. As illustrated at 1010*a*, the environment comprises a cell of the communication network. As illustrated at 1010*b*, the representation may comprise a range of different elements. The representation of a state of the communication network cell may comprise at least one of:

- a channel state measure for each node requesting allocation of cell radio resources during an allocation episode (such as a TTI), and for radio resources of the cell that are available for allocation during the allocation episode;
- a buffer state measure for each node requesting allocation of cell radio resources during the allocation episode;
- a channel direction of each node requesting allocation of cell radio resources during the allocation episode and radio resources of the cell that are available for allocation during the allocation episode; and/or
- a complex channel matrix of each node requesting allocation of cell radio resources during the allocation episode and radio resources of the cell that is available for allocation during the allocation episode.

In step 1020, the management node uses a trained SNN to generate an action prediction matrix on the basis of the state representation, wherein the action prediction matrix comprises a plurality of action predictions for actions that may be executed within the environment, and wherein each action prediction of the action prediction matrix relates to at least one of a node or a resource in the environment. As illustrated at 1020*a*, the SNN comprises a network that has been trained using a method as illustrated with reference to FIGS. 6 to 8*d*. As illustrated at 1020*b*, an action that may be executed within the environment comprises an allocation of radio resources to a node in the cell of the communication network.

In step 1030, the management node selects actions for execution in the environment on the basis of the generated action prediction matrix, and in step 1040, the management node initiates execution of the selected actions.

It will be apparent from the above discussion that the training and management methods proposed herein are particularly suited to a specific class of problem. This class of problem includes problems that are not sequential in nature but have a large action space that can benefit from a sequential approach to exploration, and for which an online phase is subject to severe time constraints. For the purposes of the present specification, a problem that is "not sequential in nature" comprises a problem for which interaction with the environment while solving the problem is not required, and consequently all information required to solve the problem is available at time zero.

There now follows a discussion of some example use cases for the methods of the present disclosure, as well as description of implementation of the methods of the present disclosure for such example use cases. It will be appreciated that the use cases presented herein are not exhaustive, but are representative of the type of problem within a communication network which may be addressed using the methods presented herein.

Use Case 1: Radio Resource Scheduling Using MCTS and Reinforcement Learning

Radio resource scheduling encompasses both frequency selective scheduling and MU-MIMO. This problem has been discussed at the beginning of the Detailed Description section of the present disclosure, and is described extensively in the internal reference document referred to above. Application of the methods proposed herein to this problem is illustrated in FIGS. 8*d* and 10.

As discussed above, one of the roles of the RAN node, or base station, in a cellular communication network is to allocate radio resources to users. This is performed once per Transmission Time Interval (TTI). When the base station allocates resources to users it can use information about the latency and throughput requirements for each user and traffic type, the users' instantaneous channel quality (including potential interference from other users) etc. Different users are typically allocated to different frequency resources (referred to in 5th generation networks as PRBs) in the process referred to as frequency selective scheduling, but different users can also be allocated to overlapping frequency resources in the case of Multi-User MIMO (MU-MIMO). The scheduling decision is sent to the user equipment (UE) in a message called Downlink Control Information (DCI) on the Physical Downlink Control Channel (PDCCH).

Frequency selective scheduling is a way to use variations in the channel's frequency impulse response, as discussed above with reference to FIG. 1. For MU-MIMO Scheduling, the base station assigns multiple users to the same time/frequency resource. This will introduce an increased amount of interference between the users and thereby reduced Signal to Interference and Noise Ratio (SINR). The reduced SINR will lead to reduced throughput and some of the potential gains with MU-MIMO may be lost.

Coordinated Multi-point Transmission (CoMP) is a set of techniques according to which processing is performed over a set of transmission points (TPs) rather than for each TP individually. This can improve performance in scenarios where the cell overlap is large and interference between TPs can become a problem. In these scenarios it can be advantageous to let the scheduler make decisions for a group of TPs rather than using uncoordinated schedulers for each TP. One such technique is Dynamic Point Blanking (DPB) where a scheduler decides (for each PRB) from which cells a UE should be served to maximize some performance metric. For example, a UE residing on the border between two TPs could be selected for scheduling in any of the two TPs or in both TPs simultaneously.

According to one example of the present disclosure, there is provided a computer implemented method for training a Student Neural Network having a plurality of parameters, wherein the Student Neural Network is for generating a resource allocation prediction matrix for a cell of a communication network, the cell comprising a plurality of nodes and a plurality of radio resources, wherein the resource allocation prediction matrix comprises a plurality of resource allocation predictions for resource allocations that may be executed within the cell, and wherein each resource allocation prediction of the resource allocation prediction matrix relates to at least one of a node or a radio resource in the cell, the method, performed by a training node, comprising:

- using a Reinforcement Learning process to train a Teacher Neural Network to generate a resource allocation prediction for a resource or node in the cell;
- using the trained Teacher Neural Network to generate a first training data set by, for each of a plurality of cells and scheduling intervals:
  - generating a representation of a state of the cell, the state representation comprising a current version of a partial allocation matrix that comprises allocation of cell radio resources to users for the scheduling interval; and sequentially, for each node or each resource in the cell:

using the trained Teacher Neural Network to generate a resource allocation prediction relating to the node or resource based on the state representation;

adding the state representation and the generated resource allocation prediction to the first training data set;

selecting a resource allocation for the node or the resource in accordance with the resource allocation prediction; and updating the state representation to include the selected resource allocation in the partial allocation matrix;

the method further comprising:

generating a second training data set from the first training data set by, for each of the plurality of cells and scheduling intervals:

generating a scheduling interval state representation comprising values that are common to all of the state representations for the scheduling interval in the first training data set; and generating a scheduling interval resource allocation prediction matrix comprising all of the generated resource allocation predictions for the scheduling interval in the first training data set; and using the second training data set to update values of the parameters of the Student Neural Network.

According to another example of the present disclosure, there is provided a computer implemented method for managing resource allocation in a cell of communication network, the cell comprising a plurality of nodes and a plurality of radio resources, the method, performed by a management node, comprising:

generating a representation of a state of the cell;

using a trained Student Neural Network to generate a resource allocation prediction matrix on the basis of the state representation, wherein the resource allocation prediction matrix comprises a plurality of resource allocation predictions for resource allocation that may be executed within the cell, and wherein each resource allocation prediction of the resource allocation prediction matrix relates to at least one of a node or a resource in the cell;

selecting a resource allocation for execution in the cell on the basis of the generated resource allocation prediction matrix; and initiating execution of the selected resource allocation;

wherein the Student Neural Network comprises a network that has been trained using a method according to the preceding example of the present disclosure.

Training of a Teacher Neural Network (Steps 610, 710, 810)

According to one example implementation of the methods disclosed herein, the same search tree approach as discussed above with reference to an internal reference document may be used during training of a TNN. According to this approach, for radio resource allocation, each node in the tree represents a scheduling decision for a user to be scheduled on one PRB. Monte Carlo Tree Search (MCTS) is one of several solutions available for efficient tree search. As the scheduling problem is not sequential by nature, the structure of the search tree is to some degree a design parameter. For example, instead of scheduling sequentially over PRBs it would be equally possible to schedule sequentially over users. This would mean initially selecting PRBs for user 1 and then continuing to user 2 etc. In this way a deep and narrow tree could be converted to a shallow and wide tree. Additionally, each level in the search tree could for example schedule two PRBs instead of one. This would mean that the number of actions in each step increases exponentially but the depth of the tree is reduced by a factor 2.

The state of the environment (communication network cell) includes the SINR for each UE per PRB and the buffer state for each UE. This SINR corresponds to the SINR disregarding inter-user interference. The buffer state is the number of packets in the buffer for each UE. The current channel allocation may also be added to the state to facilitate traversing through the decision tree. The current channel allocation is updated for each PRB that is allocated in the search tree. The SINR and buffer state is the same for all nodes in the tree. The TNN guides the traversal of the search tree, and search outputs are added to a training data set, which is then used to update the parameters of the TNN. After each iteration an evaluation is performed in which reward using the trained model is compared to reward for the optimal resource allocation. When the reward for the evaluation reaches a performance target, or a predefined number of iterations has been completed, the TNN is considered to be trained.

Following training of the TNN, the trained TNN is used to generate a first training data set, which will then be transformed to a second training data set. The second training data set is then used to train a Student Neural Network (SNN) for one-shot online inference.

Generation of First Data Set (Steps 620, 720, 820)

A plurality of scheduling problems, comprising a plurality of (simulated) cells with users requesting radio resources, is presented to the trained TNN, and multiple inferences of the TNN are used to generate resource allocations, with allocation for each PRB or user requiring an inference from the TNN. In this manner, a plurality of state representations, TNN success predictions (value predictions) and action prediction vectors are generated for each training situation.

Figure 11:
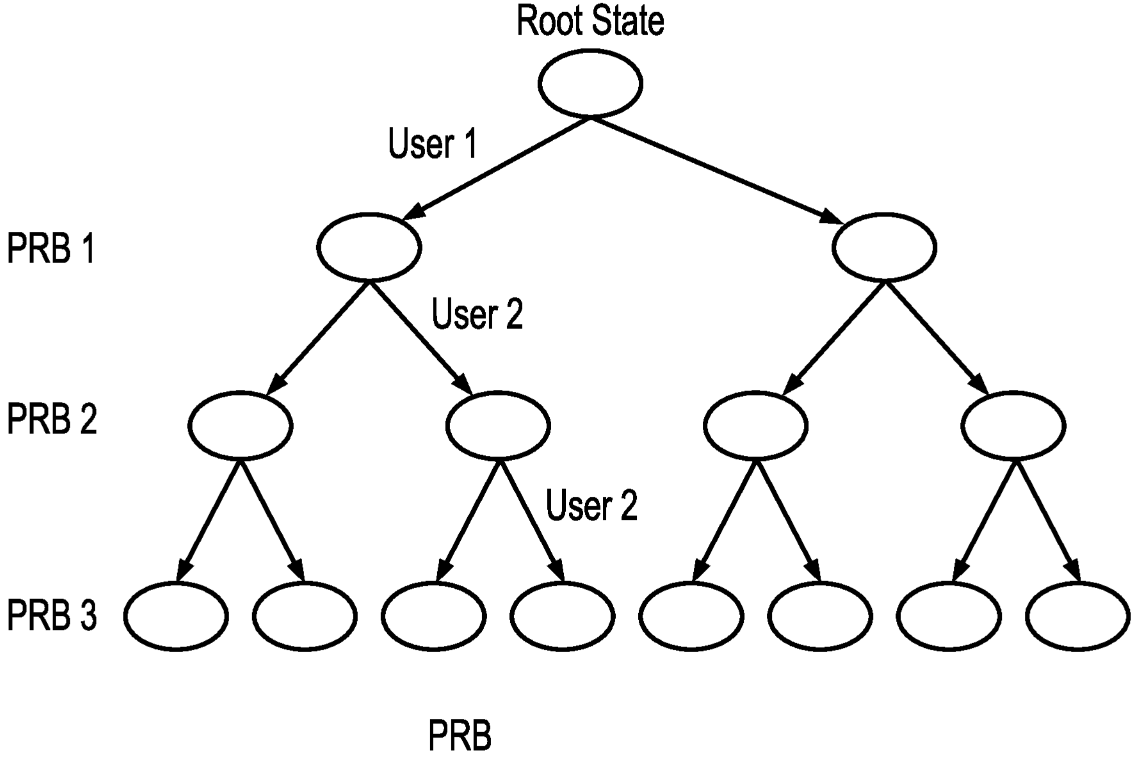
FIG. 11 illustrates a decision tree for a simple resource scheduling example.

For each training situation or problem, a plurality of state representations is available in the first data set, each state representation corresponding to an allocation decision for a single PRB or resource. For each state representation, a TNN success prediction (a value) and an action prediction vector including the probability for each action (a policy vector) is available in the first (multi-shot) data set. In FIG. 11, the decision tree for an example 2-user, 3-PRB problem is illustrated with a node for each state and edges for each possible action.

The state representation for multi-shot inference (in the first training data set) comprises:

a. Current user allocation b. Channel state (SINR)

c. Buffer State d. Channel direction

One state representation is available for each node in the search tree of FIG. 11, meaning that the current user allocation, a policy vector with a probability for each action (UE to which the PRB may be allocated) and a predicted value of being in this allocation state (TNN success prediction) is available for each node in the tree.

Figure 12:
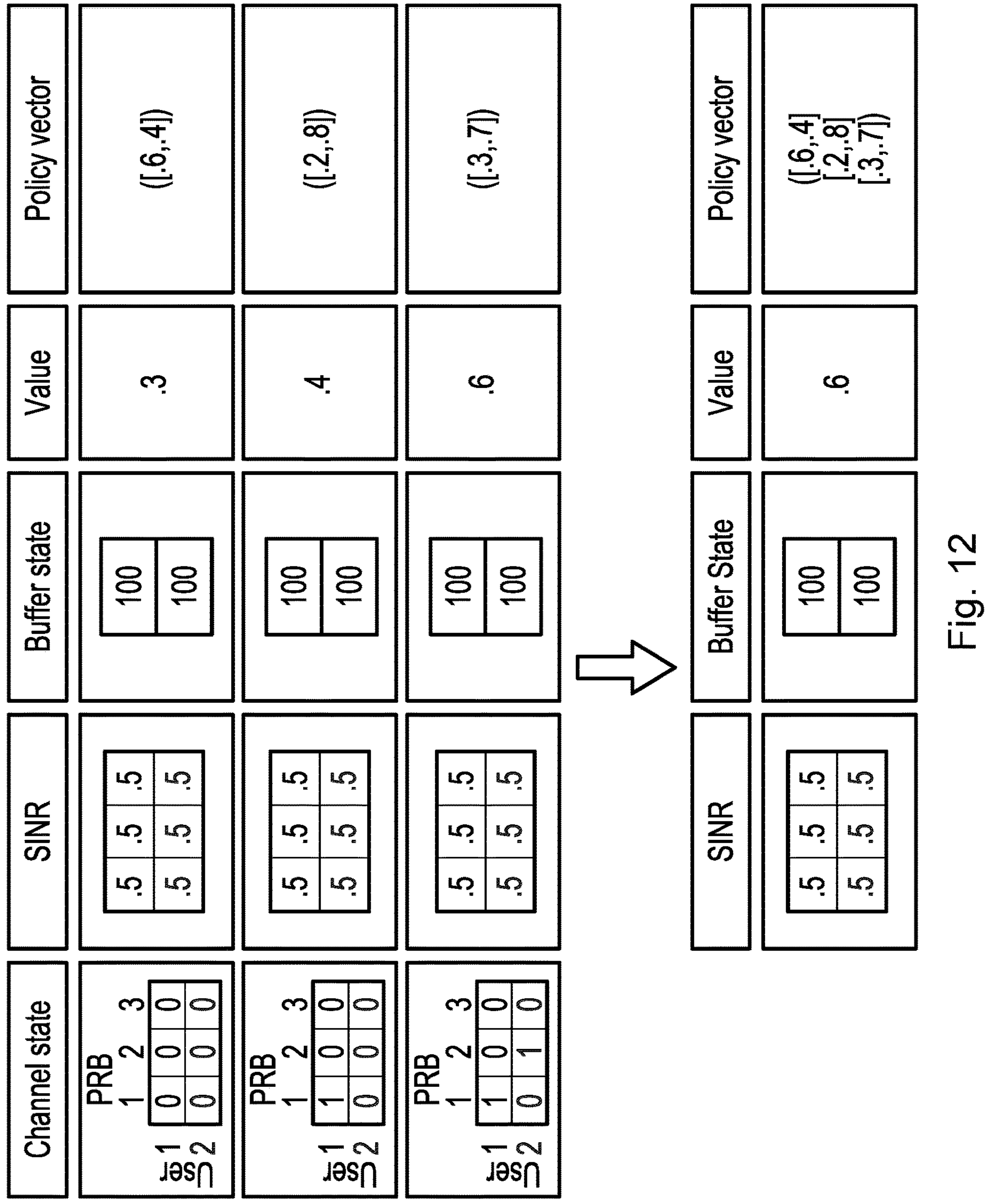
FIG. 12 illustrates example first and second training data sets.

The upper part of FIG. 12 illustrates state representation (columns 1202, 1204, 1206), value (TNN success prediction 1208) and policy vector (action prediction vector 1210) for a single training situation corresponding to the example problem of FIG. 11. Allocation for each of the three PRBs is illustrated in a separate row of the upper part of FIG. 12.

Generation of Second Data Set (Steps 630, 730, 830)

The data set for multi-shot inference is transformed to be used for the training of the one-shot model. This transformation is illustrated in FIG. 12, with the lower part of FIG.

12 showing the second training data set for the single training situation that is generated from the first training data set shown in the upper part of FIG. 12.

Referring to FIG. 12, the state representation in the second training data set maintains from the first data set only those elements that are common to all three PRBs. The partial allocation matrix of column 1202 is removed, leaving only the SINR and Buffer state that are consistent for the state for allocation of all three PRBs. In the value column, only the last value is retained in the second data set. This corresponds to the final prediction of action success, and therefore supersedes the value predictions for PRBs 1 and 2, and represents the predicted value of the overall allocation including the three PRBs. In the policy vector column, all policies (action probability vectors) for the same combined state (i.e. the same training situation) are combined into a single matrix (action prediction matrix).

One-Shot Model Training (Steps 640, 740, 840)

The Student Neural Network is trained using the second data set. During training, for each state in the second training data set, a policy header with the probabilities for all actions for the state, and the final predicted value for the state, are used as labels for training the one-shot SNN model. A loss function is trained to reduce the delta between the predicted probabilities for the policy actions in the matrix generated by the SNN and the policy action matrix in the training data set. In one example, cross entropy may be used to obtain the delta between the two predicted probability distributions. In other examples, other measures of this delta may be used, including for example Kullback Leibler (KL) divergence, reverse KL divergence or a related measure. The delta between predicted value from the SNN and second training data set may also be added, and a sum of the two deltas may be used as the loss function. The sum may be a weighted sum, and may for example place a higher weight on the loss from the policy.

Figure 13:
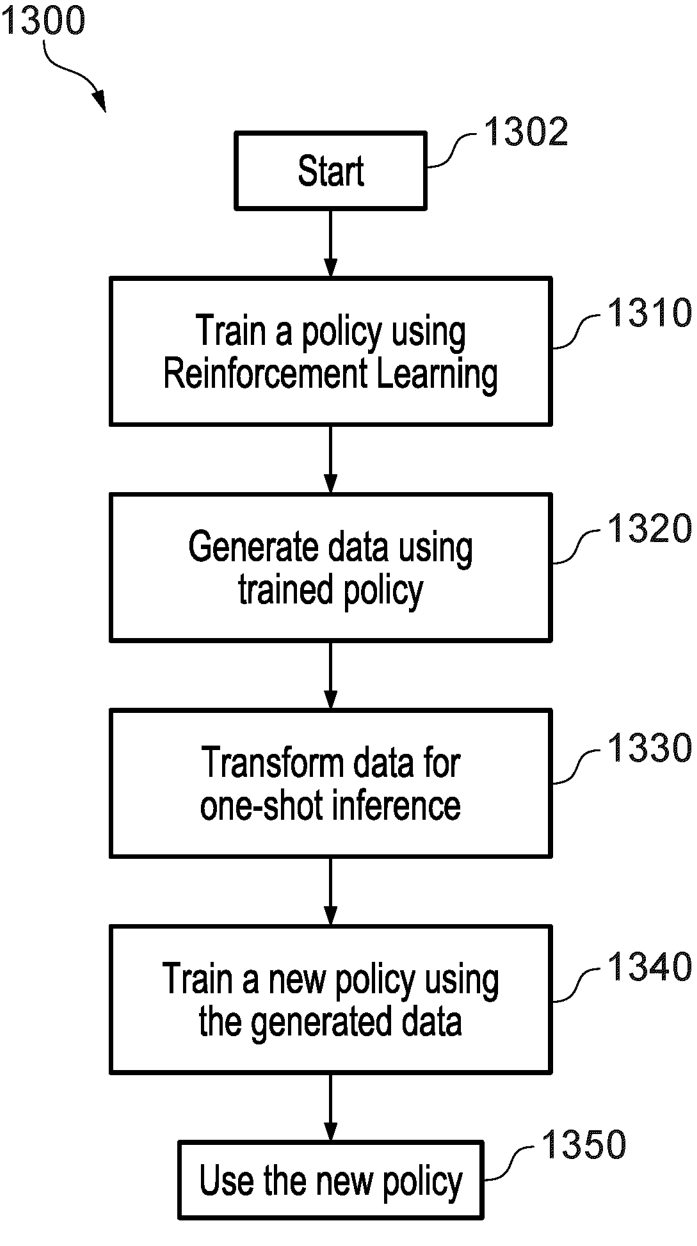
FIG. 13 illustrates an example process flow combining implementation of methods of FIGS. 6 and 9.

FIG. 13 illustrates an example process flow 1300 combining implementation of methods 600 and 900 for the frequency allocation use case.

Referring to FIG. 13, during offline training, steps 1310 to 1340 are performed:

- 1310: Train a policy (TNN) using Reinforcement Learning. This step can for example be conducted using any RL process including MCTS-based RL (AlphaZero etc.), Deep Q-learning, Asynchronous Advantage Actor-Critic (A3C), Proximal Policy Optimization (PPO), Trust Region Policy Optimization (TRPO), Deep Deterministic Policy Gradient (DDPG), or others.
- 1320: Generate data using the trained policy. The trained policy (TNN) is used to solve a set of problems. The input states and the selected action probabilities are stored as a first data set.
- 1330: The first data set is transformed into a second data set for one-shot training. The dataset is transformed by collecting the action probabilities for each step in the multi-shot prediction. Also, some parts of the state indicate which step in the sequence that is currently being processed and which actions have been selected previously, and these parts of the state are removed. In some examples, the target probabilities may additionally be softened using a high temperature softmax.
- 1340: Train a new neural network (SNN) on the transformed (second) data set. The SNN may be considerably smaller than the TNN in addition to providing an output that guides a plurality of actions corresponding to each step for the multi-shot TNN.

During Online Operation, Step 1350 is Performed:

- 1350: During inference the one-shot model is used to predict the optimal PRB allocation in one step. Each action corresponds to allocation of a different user to the given PRB, and for each PRB, the user with the highest probability is selected. The process is illustrated more completely in FIG. 14.

Figure 14:
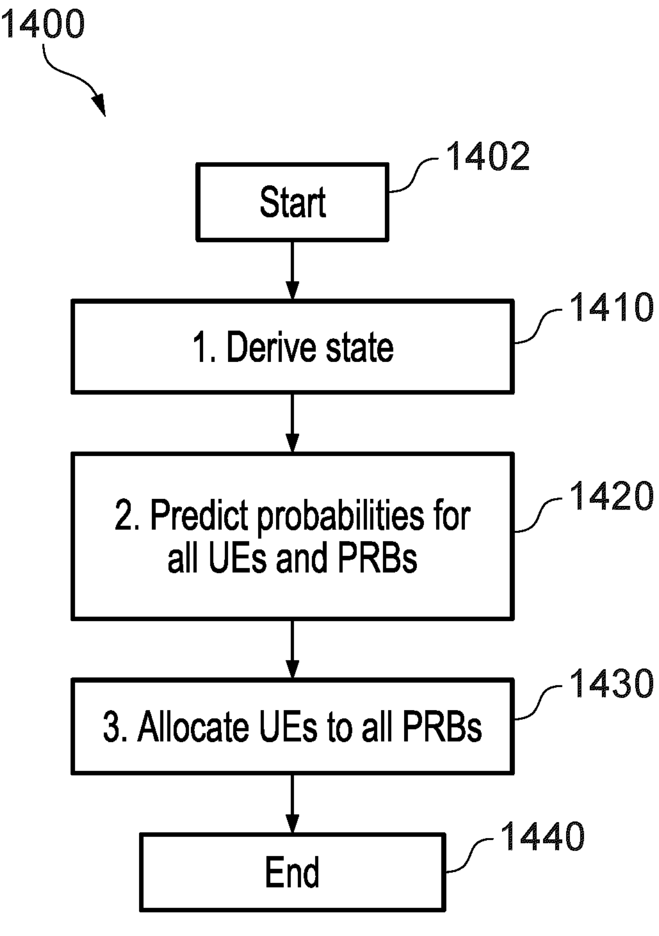
FIG. 14 illustrates an example process flow implementing the method of FIG. 9.

Referring to FIG. 14, steps 1402 to 1440 are carried out during online operation.

- 1402: At the start of online operation, a number of users are requesting radio resources, and so waiting to be scheduled on a group of PRBs.
- 1410: The state for the current TTI is generated or derived, this includes the SINR for all UEs per PRB and the buffer state per UE.
- 1420: Probabilities for each UE for all PRBs are predicted through a single inference of the trained one-shot SNN.
- 1430: The action (UE) with the highest probability for each PRB is selected and selected UEs are allocated to the PRBs.
- 1440: Scheduling for the current TTI is complete.

Prototype Performance

Figure 15:
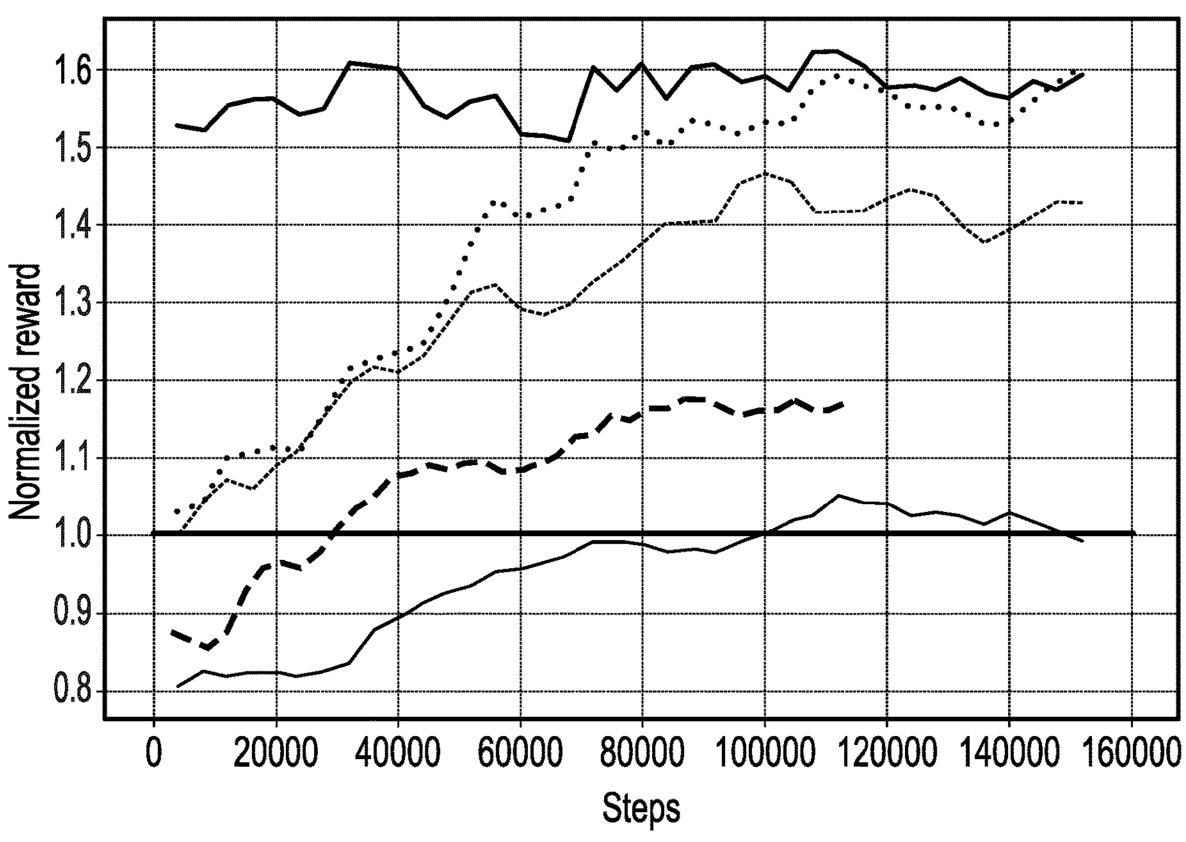
FIG. 15 illustrates comparative performance of a multi-shot Teacher Neural Network.

FIG. 15 illustrates comparative performance of a one shot SNN for which the training data was generated by a TNN trained using the combination of MCTS and RL described above and applied to a frequency selective scheduling problem. The medium weight continuous line graph (20 PRBs, 6 users, buffer=U(1000,8000) bits, data generation) illustrates reward during generation of the data set with multi-shot NN inference and MCTS during generation of training data. The spaced dotted graph (20 PRBs, 6 users, buffer=U(1000,8000) bits) shows inference performance of the one-shot model alone, and illustrates that the one-shot inference results in slightly increased reward after the final iteration (after 15000 training steps). The heaviest weight continuous line graph (Baseline) shows the base line, which represents current standard methods for frequency selective scheduling.

The tests are performed with different buffer sizes, as illustrated in the legend, where U(X,Y) means that the number of bits in the buffer is distributed between X and Y. The lightest weight continuous line graph (20 PRBs, 6 users buffer=U(1000,15000) bits illustrates a case in which there is a lot of data in the buffer most of the time (more than that illustrated in the spaced dotted graph discussed above), and shows that the performance is similar to the base line.

Figure 16:
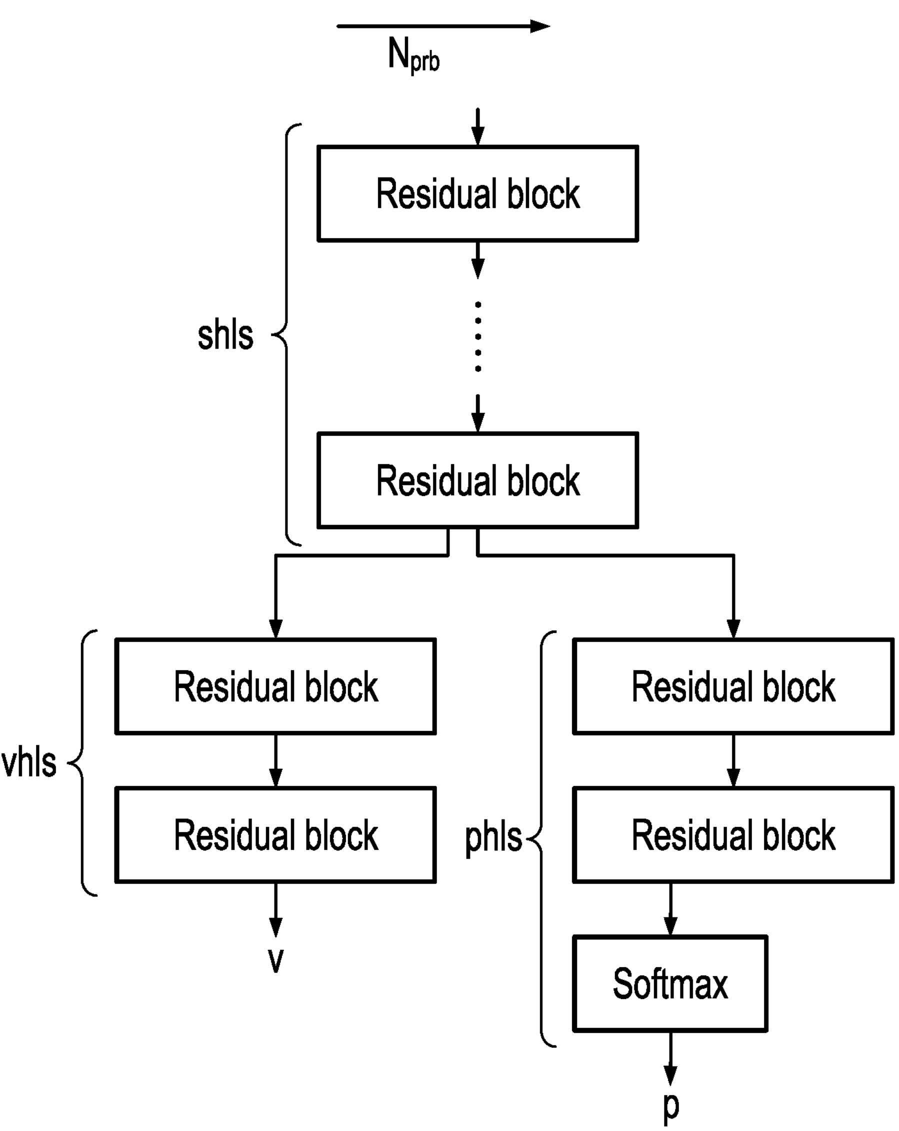
FIG. 16 illustrates Neural Network structure.
Figure 17:
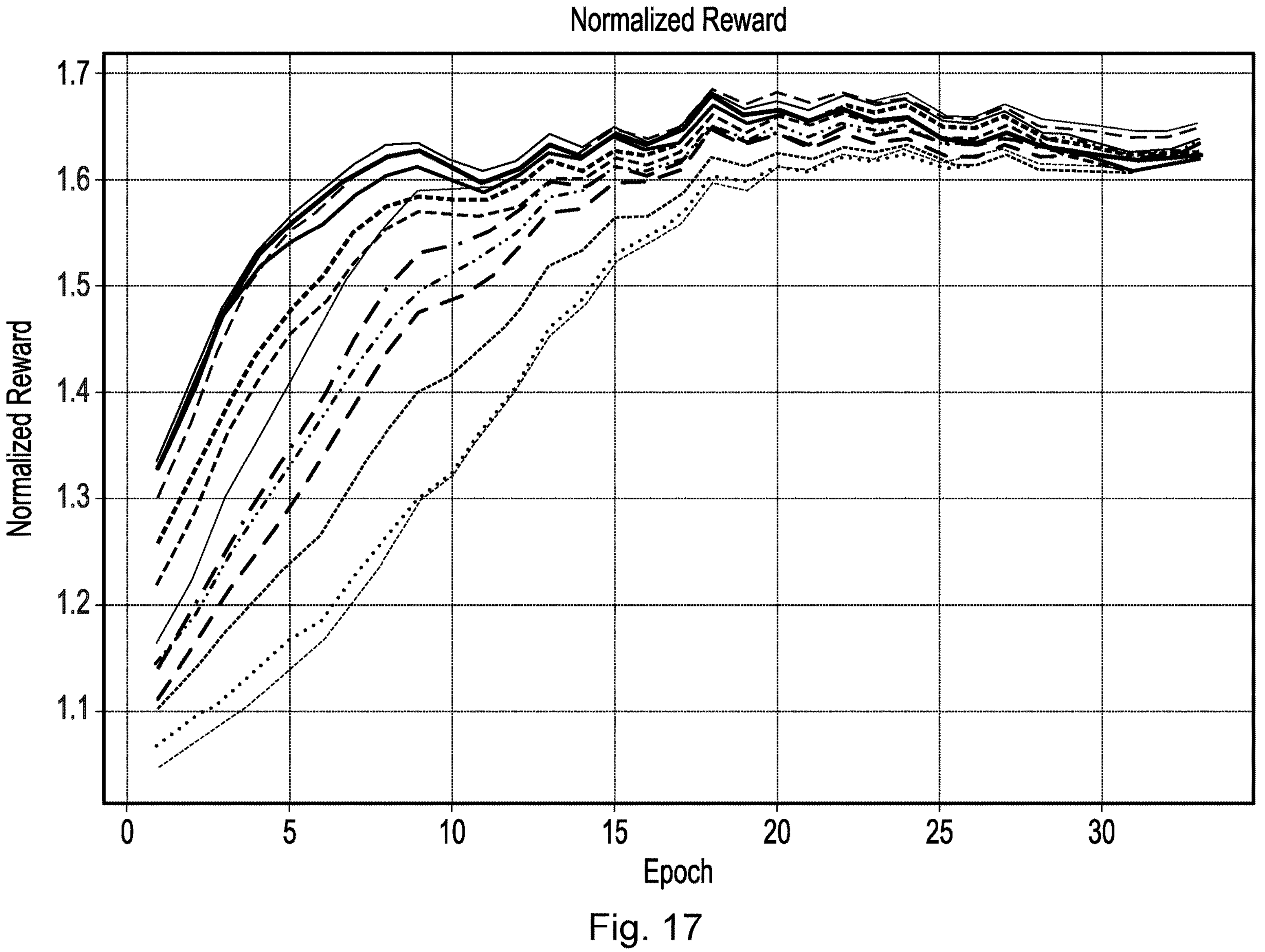
FIG. 17 illustrates performance of different sizes of one-shot Student Neural Network.

FIG. 17 illustrates performance of different sizes of one-shot inference model against the multi-shot inference model illustrated in the cyan graph of FIG. 15. As illustrated in FIG. 16, the terms shls, vhls and phls refer respectively to:

- shls: hidden layer sizes for the stem of the one-shot inference model (SNN)
- vhls: hidden layer sizes for the value head (SNN success prediction) of the one-shot inference model (SNN)
- phis: hidden layer sizes for the policy head (probability predictions) of the one-shot inference model (SNN)

Referring to FIG. 17, it can be seen that even for relatively small one-shot inference neural networks (SNNs) of the order of:

shls=128,128,128 phls=128 vhls=128 performance that matches or even exceeds that of the multi-shot inference model can be achieved.

CoMP Techniques

CoMP can be seen as a problem quite similar to MU-MIMO scheduling, and consequently the above discussion of frequency selective scheduling can largely be applied to CoMP, with some adaptations to the nature of the actions. For example, instead of deciding which users should be scheduled on a given PRB the problem could be to decide from which cells to serve a given user (for a given PRB). In that case instead of actions being the users to schedule in a given cell (and PRB) it would be the cells to schedule (for a given user and PRB).

Use Case 2: Remote Electronic Tilt Optimization Using Reinforcement Learning

Antenna tilt optimization is a problem to which Deep Q-learning has been successfully applied. In order to be able to efficiently provide a high level of Quality of Service (QoS) to users, networks must adjust their configuration in an automatic and timely manner. Antenna vertical tilt angle, referred to as downtilt angle, is one of the most important variables to control for QoS management. The problem is to adjust the antenna tilt for each individual cell in light of a plurality of cell and user locations as well as the current antenna tilts of neighbouring cells. The objective is to maximize some trade-off between capacity (for example total cell throughput) and coverage (for example $5^{th}$ percentile user throughput). This use case can be reframed as a sequential decision-making problem by successively updating the antenna tilt of each cell. With such a problem formulation, the action space can be relatively small, for example $\{-\delta, 0, +\delta\}$, where $\delta$ is the angular update to the antenna tilt for a cell.

The methods proposed herein can be applied to this use case as the full state is known: cell locations do not change, and it may be assumed that user locations, as well as appropriate coverage and capacity metrics, do not change between tilt updates of different cells.

According to one example of the present disclosure, there is provided a computer implemented method for training a Student Neural Network having a plurality of parameters, wherein the Student Neural Network is for generating a Remote Electronic Tilt (RET) prediction matrix for an environment comprising a plurality of cells of a communication network, each cell served by a Radio Access Network (RAN) node, wherein the RET prediction matrix comprises a plurality of RET predictions for the environment, and wherein each RET prediction of the RET prediction matrix relates to a RAN node in the environment, the method, performed by a training node, comprising:

- using a Reinforcement Learning process to train a Teacher Neural Network to generate a RET prediction for a RAN node in the environment;
- using the trained Teacher Neural Network to generate a first training data set by, for each of a plurality of environments and time periods:
  - generating a representation of a state of the environment, the state representation comprising a current version of a partial RET matrix that comprises RET values for RAN nodes in the environment during the time period; and
  - sequentially, for each RAN node in the environment:
    - using the trained Teacher Neural Network to generate a RET prediction relating to the RAN node based on the state representation;
    - adding the state representation and the generated RET prediction to the first training data set;
    - selecting a RET value for the RAN node in accordance with the RET prediction; and
    - updating the state representation to include the selected RET value in the partial RET matrix;

the method further comprising:

- generating a second training data set from the first training data set by, for each of the plurality of environments and time periods:
  - generating a time period state representation comprising values that are common to all of the state representations for the time period in the first training data set; and
  - generating a time period RET prediction matrix comprising all of the generated RET predictions for the time period in the first training data set; and
- using the second training data set to update values of the parameters of the Student Neural Network.

According to another example of the present disclosure, there is provided a computer implemented method for managing Remote Electronic Tilt (RET) in an environment of a communication network, the environment comprising a plurality of cells of the communication network, each cell served by a Radio Access Network (RAN) node, the method, performed by a management node, comprising:

- generating a representation of a state of the environment;
- using a trained Student Neural Network to generate a RET prediction matrix on the basis of the state representation, wherein the RET prediction matrix comprises a plurality of RET predictions for the environment, and wherein each RET prediction of the RET prediction matrix relates to a RAN node in the environment;
- selecting RET values for RAN nodes in the environment on the basis of the generated RET prediction matrix; and
- initiating application of the selected RET values;

wherein the Student Neural Network comprises a network that has been trained using a method according to the preceding example of the present disclosure.

It will be appreciated that a single RAN node may comprise a plurality of antennas, each of which may have an individual downtilt angle. In such examples, each antenna that is individually controlled by be considered as an individual RAN node, together with the area of the cell served by the antenna.

Use Case 3: Packet Routing

Packet routing is another problem that is combinatorial by nature and can be seen as a variant of the Travelling Salesman Problem. Certain types of packet routing problem may be considered to be sequential by nature, and consequently less suited to the methods disclosed herein. However, under certain circumstances, it may be that routing decisions can be taken in a central location, with any changes in network state between routing steps being small enough to be ignored. An example of such a situation is Integrated Access Backhaul, in which routing can be performed in a central location, and measurements related to the potential hops in the path can be collected at this central location. Here, the problem is to route a packet from a source node to a destination node via a set of intermediate nodes with as little associated cost as possible. The cost can for example be the number of hops, the total delay, the throughput for a user over the path, and/or the total transmitted energy, including for example cost for power supply and/or interference caused by a large number of packets simultaneously being transferred on the same link or through the same router, which interference may additionally impact delay and throughput. In some examples, cost may comprise a combination of these factors.

A centrally executed routing problem can be solved sequentially with reinforcement learning by using a state that may contain for example:

- the number of IP packets in the buffer in a router node;
- the location of the nodes (including source and destination);
- connectivity between the nodes (including in some examples delay or path gain); and
- in which node the packet currently resides.

In the Integrated Access Backhaul example, the nodes would be IAB nodes, i.e. RAN nodes that can forward traffic by acting as both a UE and a base station. It will be appreciated that there are many potential aspects of the quality for each link that could usefully be included in the state. As noted above, examples of such link quality aspects may include an estimate of the delay that is based on the path gain (which is related to the amount of segmentation that is needed to get a packet through), as well as the amount of congestion of the hop.

The action would be to which node the packet should next be sent.

The methods proposed herein can also be applied to this use case. In generating the second training data set for training the one-shot SNN, the information about in which node the packet currently resides would be removed, and the output of the SNN would be a sequence of nodes through which the packet is to be routed.

According to one example of the present disclosure, there is provided a computer implemented method for training a Student Neural Network having a plurality of parameters, wherein the Student Neural Network is for generating a packet routing prediction matrix for an environment of a communication network, the environment comprising a plurality of nodes, wherein the packet routing prediction matrix comprises a plurality of packet routing predictions for routing decisions that may be executed on the packet within the environment, and wherein each packet routing prediction of the packet routing prediction matrix relates to a node of the environment, the method, performed by a training node, comprising:

- using a Reinforcement Learning process to train a Teacher Neural Network to generate a packet routing prediction for a node in the environment;
- using the trained Teacher Neural Network to generate a first training data set by, for each of a plurality of environments and routing tasks, each routing task comprising a source node and a destination node for a packet:
  - generating a representation of a state of the environment, the state representation comprising a current version of a partial routing matrix that comprises routing decisions for the routing task; and
  - sequentially, for each node in the environment:
    - using the trained Teacher Neural Network to generate a packet routing prediction relating to the node based on the state representation;
    - adding the state representation and the generated packet routing prediction to the first training data set;
    - selecting a routing decision for the node in accordance with the packet routing prediction; and
    - updating the state representation to include the selected routing decision in the partial routing matrix;

the method further comprising:

- generating a second training data set from the first training data set by, for each of the plurality of environments and routing tasks:
  - generating a routing task state representation comprising values that are common to all of the state representations for the routing task in the first training data set; and
  - generating a routing task packet routing prediction matrix comprising all of the generated packet routing predictions for the routing task in the first training data set; and
- using the second training data set to update values of the parameters of the Student Neural Network.

According to another example of the present disclosure, there is provided a computer implemented method for managing packet routing in an environment of a communication network, the environment comprising a plurality of nodes, the method, performed by a management node, comprising:

- generating a representation of a state of the environment;
- using a trained Student Neural Network to generate a packet routing prediction matrix on the basis of the state representation, wherein the packet routing prediction matrix comprises a plurality of packet routing predictions for routing decisions that may be executed on the packet within the environment, and wherein each packet routing prediction of the packet routing prediction matrix relates to a node of the environment;
- selecting a packet routing for execution in the environment, the packet routing comprising a plurality of routing decisions for a packet, on the basis of the generated packet routing prediction matrix; and
- initiating execution of the selected packet routing;

wherein the Student Neural Network comprises a network that has been trained using a method according to the preceding example of the present disclosure.

Use Case 4: Downlink Power Control

Downlink power control setting for radio networks is another problem that has been studied in the context of reinforcement learning. Traditionally, downlink transmit power for RAN nodes is set to use the maximum available power. However, higher transmit power not only increases the received power for the UE but also creates higher interference towards users in other cells. As different UEs require different data rates, some gains may be expected if downlink transmit powers were to be adjusted based on the current situation in the network.

One solution that has been proposed is to use a Deep Q Network to set output powers of different cells. For example, the state that is fed to the DQN can be the SINRs and path gains for different UEs as well as the current downlink power and an indication of the current cell for which power is to be adjusted. The action is then the proposed downlink power (or power adjustment) for the indicated cell. In order to obtain an updated transmit power setting for all cells, each cell in the network, or a part of the network, would be considered in turn.

The methods proposed herein can also be applied to this use case. The state would include SINRs, path gains and current powers as described above but, during inference would not include the current cell to be adjusted as adjustments for all cells are generated in a single inference. Actions would be a set of adjustment commands (one for each cell).

According to one example of the present disclosure, there is provided a computer implemented method for training a Student Neural Network having a plurality of parameters, wherein the Student Neural Network is for generating a Downlink transmit power (DL power) prediction matrix for an environment comprising a plurality of cells of a communication network, each cell served by a Radio Access Network (RAN) node, wherein the DL power prediction matrix comprises a plurality of DL power predictions for the environment, and wherein each DL power prediction of the DL power prediction matrix relates to a RAN node in the environment, the method, performed by a training node, comprising:

- using a Reinforcement Learning process to train a Teacher Neural Network to generate a DL power prediction for a RAN node in the environment;
- using the trained Teacher Neural Network to generate a first training data set by, for each of a plurality of environments and time periods:
  - generating a representation of a state of the environment, the state representation comprising a current version of a partial DL power matrix that comprises DL power values for RAN nodes in the environment during the time period; and
  - sequentially, for each RAN node in the environment:
    - using the trained Teacher Neural Network to generate a DL power prediction relating to the RAN node based on the state representation;
    - adding the state representation and the generated DL power prediction to the first training data set;
    - selecting a DL power value for the RAN node in accordance with the DL power prediction; and
    - updating the state representation to include the selected DL power value in the partial DL power matrix;

the method further comprising:

- generating a second training data set from the first training data set by, for each of the plurality of environments and time periods:
  - generating a time period state representation comprising values that are common to all of the state representations for the time period in the first training data set; and
  - generating a time period DL power prediction matrix comprising all of the generated DL power predictions for the time period in the first training data set; and
- using the second training data set to update values of the parameters of the Student Neural Network.

According to another example of the present disclosure, there is provided a computer implemented method for managing Downlink transmit power (DL power) in an environment of a communication network, the environment comprising a plurality of cells of the communication network, each cell served by a Radio Access Network (RAN) node, the method, performed by a management node, comprising:

- generating a representation of a state of the environment;
- using a trained Student Neural Network to generate a DL power prediction matrix on the basis of the state representation, wherein the DL power prediction matrix comprises a plurality of DL power predictions for the environment, and wherein each DL power prediction of the DL power prediction matrix relates to a RAN node in the environment;
- selecting DL power values for RAN nodes in the environment on the basis of the generated DL power prediction matrix; and
- initiating application of the selected DL power values;

wherein the Student Neural Network comprises a network that has been trained using a method according to the preceding example of the present disclosure.

Problems that are Sequential by Nature or Evolve Over Time

Problems in which the management node, and/or another agent, interacts with the environment during solution of the problem are not suited to the methods proposed herein. Similarly, problems in which the environment evolves over time may not be suited to these methods, as it cannot be guaranteed the full state of the environment can be known at time step zero.

Time domain scheduling is an example of such a problem in the domain of communication networks. In time domain scheduling, there exists a set of users that are eligible for scheduling in the current or a future subframe, and the problem is to decide when to schedule the different users. It would be possible for a management node to make decisions for the current and a number of future subframes in one inference, but as the environment evolves in a way that is not fully controlled by the node, including for example packets for new users arriving, the node would benefit from receiving an updated environment state after each time step.

As discussed above, the methods 600, 700 and 800 are performed by a training node, and the present disclosure provides a training node that is adapted to perform any or all of the steps of the above discussed methods. The training node may be a physical or virtual node, and may for example comprise a virtualised function that is running in a cloud, edge cloud or fog deployment. The training node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node.

Figure 18:
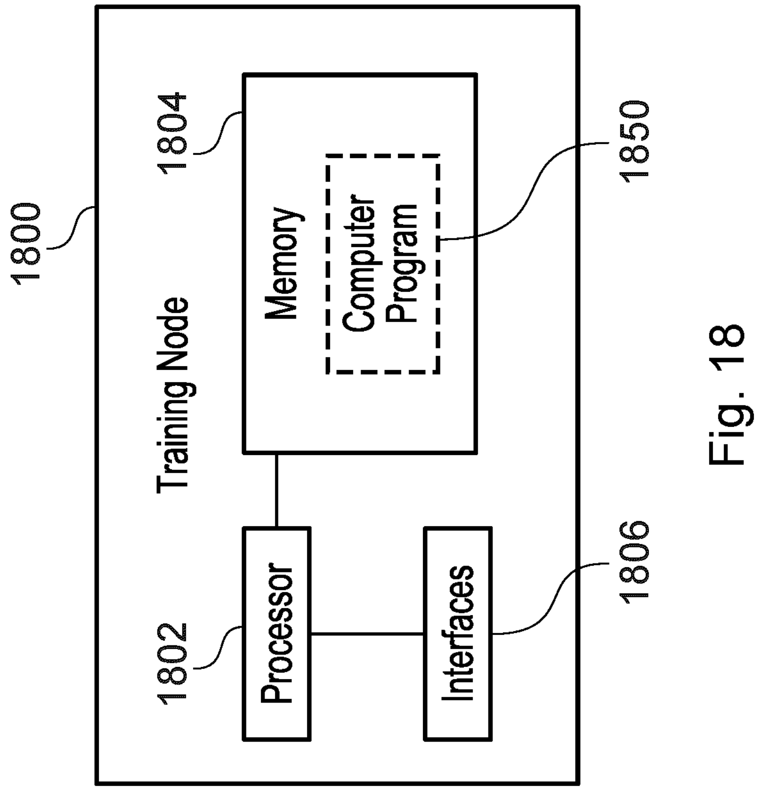
FIG. 18 illustrates functional modules in a training node.

FIG. 18 is a block diagram illustrating an example training node 1800 which may implement the method 600, 700 and/or 800, as illustrated in FIGS. 6 to 8*d*, according to examples of the present disclosure, for example on receipt of suitable instructions from a computer program 1850. Referring to FIG. 18, the training node 1800 comprises a processor or processing circuitry 1802, and may comprise a memory 1804 and interfaces 1806. The processing circuitry 1802 is operable to perform some or all of the steps of the method 600, 700 and/or 800 as discussed above with reference to FIGS. 6 to 8*d*. The memory 1804 may contain instructions executable by the processing circuitry 1802 such that the training node 1800 is operable to perform some or all of the steps of the method 600, 700 and/or 800, as illustrated in FIGS. 6 to 8*d*. The instructions may also include instructions for executing one or more telecommunications and/or data communications protocols. The instructions may be stored in the form of the computer program 1850. In some examples, the processor or processing circuitry 1802 may include one or more microprocessors or microcontrollers, as well as other digital hardware, which may include digital signal processors (DSPs), special-purpose digital logic, etc. The processor or processing circuitry 1802 may be implemented by any type of integrated circuit, such as an Application Specific Integrated Circuit (ASIC), Field Programmable Gate Array (FPGA) etc. The memory 1804 may include one or several types of memory suitable for the processor, such as read-only memory (ROM), random-access memory, cache memory, flash memory devices, optical storage devices, solid state disk, hard disk drive etc.

Figure 19:
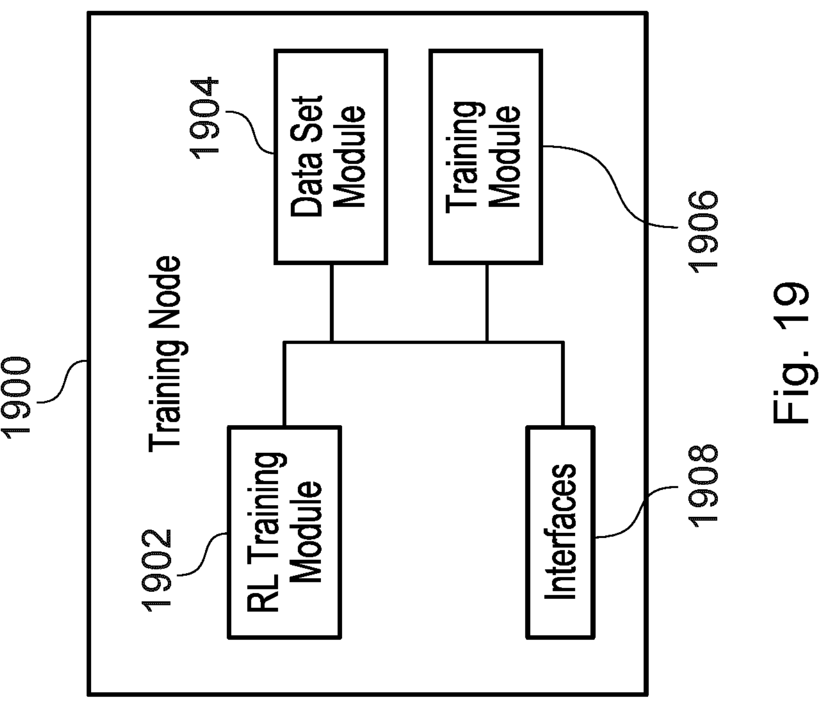
FIG. 19 illustrates functional modules in another example of training node.

FIG. 19 illustrates functional modules in another example of training node 1900 which may execute examples of the methods 600, 700 and/or 800 of the present disclosure, for example according to computer readable instructions received from a computer program. It will be understood that the modules illustrated in FIG. 19 are functional modules, and may be realised in any appropriate combination of hardware and/or software. The modules may comprise one or more processors and may be integrated to any degree.

Referring to FIG. 19, the training node 1900 is for training a Student Neural Network having a plurality of parameters, wherein the Student Neural Network is for generating an action prediction matrix for an environment in a communication network. The environment comprises a plurality of nodes and a plurality of communication network resources, the action prediction matrix comprises a plurality of action predictions for actions that may be executed within the environment, and each action prediction of the action prediction matrix relates to at least one of a node or a resource in the environment. The training node 1900 comprises an RL training module 1902 for using a Reinforcement Learning process to train a Teacher Neural Network to generate an action prediction for a resource or node in the environment. The training node 1900 further comprises a data set module 1904 for using the trained Teacher Neural Network to generate a first training data set by, for each of a plurality of training situations:

- generating a representation of a state of the environment, the state representation comprising a current version of a partial action matrix that comprises actions for execution within the environment, each action relating to at least one of a node or a resource in the environment; and
- sequentially, for each node or each resource in the environment:
  - using the trained Teacher Neural Network to generate an action prediction relating to the node or resource based on the state representation;
  - adding the state representation and the generated action prediction to the first training data set;
  - selecting an action for execution on the node or the resource in accordance with the action prediction; and
  - updating the state representation to include the selected action in the partial action matrix.

The data set module 1904 is also for generating a second training data set from the first training data set by, for each of the plurality of training situations:

- generating a training situation state representation comprising values that are common to all of the state representations for the training situation in the first training data set; and
- generating a training situation action prediction matrix comprising all of the generated action predictions for the training situation in the first training data set.

The training node 1900 further comprises a training module 1906 for using the second training data set to update values of the parameters of the Student Neural Network.

The training node 1900 may further comprise interfaces 1908 which may be operable to facilitate communication with a management node, and/or with other communication network nodes over suitable communication channels.

As discussed above, the methods 900 and 1000 may be performed by a management node, and the present disclosure provides a management node that is adapted to perform any or all of the steps of the above discussed methods. The management node may be a physical or virtual node, and may for example comprise a virtualised function that is running in a cloud, edge cloud or fog deployment. The management node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node.

Figure 20:
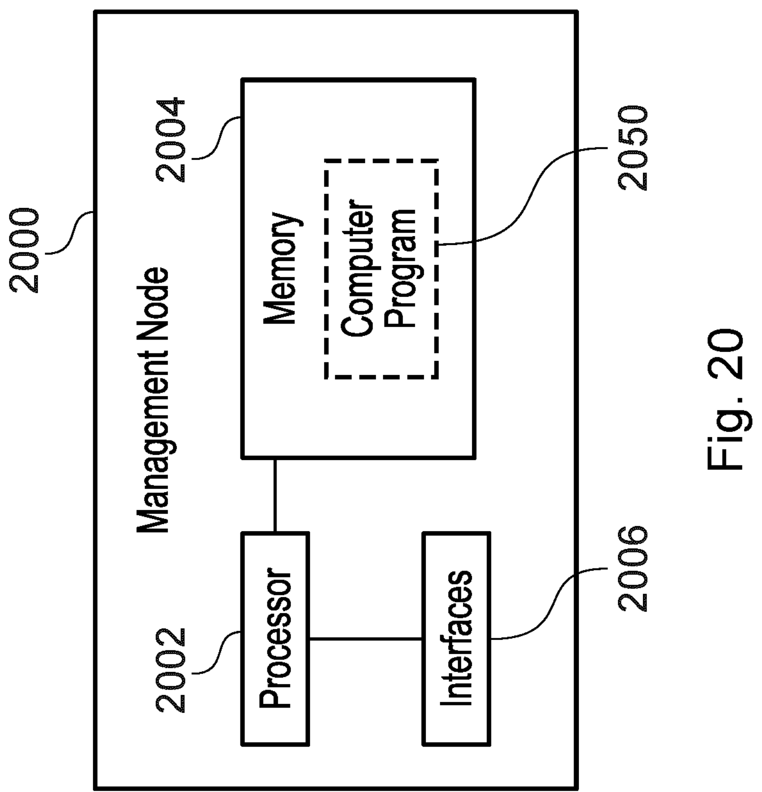
FIG. 20 illustrates functional modules in a management node.

FIG. 20 is a block diagram illustrating an example management node 2000 which may implement the method 900 and/or 1000, as illustrated in FIGS. 9 and 10, according to examples of the present disclosure, for example on receipt of suitable instructions from a computer program 2050. Referring to FIG. 20, the management node 2000 comprises a processor or processing circuitry 2002, and may comprise a memory 2004 and interfaces 2006. The processing circuitry 2002 is operable to perform some or all of the steps of the method 900 and/or 1000 as discussed above with reference to FIGS. 9 and 10. The memory 2004 may contain instructions executable by the processing circuitry 2002 such that the management node 2000 is operable to perform some or all of the steps of the method 900 and/or 1000, as illustrated in FIGS. 9 and 10. The instructions may also include instructions for executing one or more telecommunications and/or data communications protocols. The instructions may be stored in the form of the computer program 2050. In some examples, the processor or processing circuitry 2002 may include one or more microprocessors or microcontrollers, as well as other digital hardware, which may include digital signal processors (DSPs), special-purpose digital logic, etc. The processor or processing circuitry 2002 may be implemented by any type of integrated circuit, such as an Application Specific Integrated Circuit (ASIC), Field Programmable Gate Array (FPGA) etc. The memory 2004 may include one or several types of memory suitable for the processor, such as read-only memory (ROM), random-access memory, cache memory, flash memory devices, optical storage devices, solid state disk, hard disk drive etc.

Figure 21:
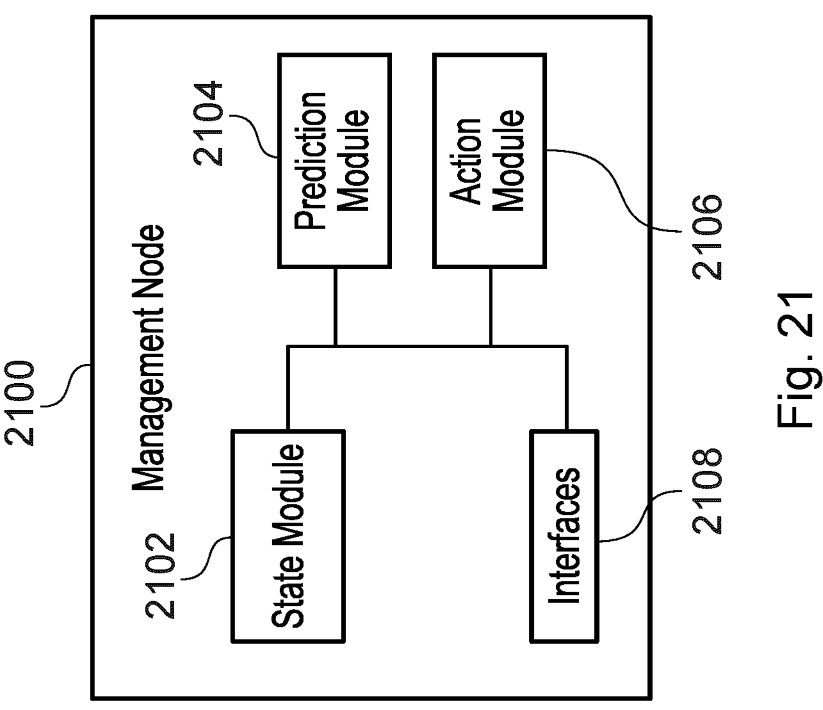
FIG. 21 illustrates functional modules in another example of management node.

FIG. 21 illustrates functional modules in another example of management node 2100 which may execute examples of the methods 900 and/or 1000 of the present disclosure, for example according to computer readable instructions received from a computer program. It will be understood that the modules illustrated in FIG. 21 are functional modules, and may be realised in any appropriate combination of hardware and/or software. The modules may comprise one or more processors and may be integrated to any degree.

Referring to FIG. 21, the management node 2100 is for managing an environment within a communication network, the environment comprising a plurality of nodes and a plurality of communication network resources. The management node 2100 comprises a state module 2102 for generating a representation of a state of the environment. The management node 2100 further comprises a prediction module 2104 for using a trained Student Neural Network to generate an action prediction matrix on the basis of the state representation, wherein the action prediction matrix comprises a plurality of action predictions for actions that may be executed within the environment, and wherein each action prediction of the action prediction matrix relates to at least one of a node or a resource in the environment. The management node 2100 further comprises an action module 2106 for selecting actions for execution in the environment on the basis of the generated action prediction matrix, and for initiating execution of the selected actions. The Student Neural Network used by the prediction module 2104 comprises a network that has been trained using a method according to examples of the present disclosure.

The management node 2100 may further comprise interfaces 2108 which may be operable to facilitate communication with a training node and/or with other communication network nodes over suitable communication channels.

Examples of the present disclosure provide methods and nodes that enable the use of a sequential approach to solve problems with a large action space that are not sequential by nature but require fast execution in an online phase. As discussed above, sequential algorithms are generally effective at solving problems with a large action space, and may be useful also for solving problems that are not sequential by nature but have a large solution space. Such algorithms are however unsuitable for use in situations requiring low latency. Examples of the present disclosure enable use of sequential learning processes for training, while also providing fast execution, by transferring learning from the sequential training process to an inference model that maps directly to a solution for every element that was considered sequentially in the training phase. Methods according to the present disclosure may be useful for any type of problem with a large solution space that is not sequential by nature, and offer particular advantages for such problems that ae also subject to time constraints for the inference phase, for example requiring real time execution.

Examples of the present disclosure incorporate the excellent potential for solution space exploration that is offered by sequential approaches, while significantly reducing the computation cost and time delay for associated with live application of such approaches. This reduction is achieved by transferring learning from a sequential approach to a "one-shot" model for inference, as well as incorporating elements of model distillation, to ensure the one-shot inference model is as efficient as possible. Model complexity may also be reduced by the transformation to one-shot inference. This reduction in complexity may be attributed to the possibility for the one-shot model to reuse lower level computations (i.e. computations performed close to the input layer) further up in the model (i.e. closer to the output layer). For example, the multi-shot or sequential approach model, when generating a prediction for the first resource or node under consideration, considers nodes or resources across the environment. Generating a prediction for all nodes or resources in the environment simultaneously in the one-shot model can consequently greatly improve model efficiency. Prototype tests of the methods disclosed herein applied to a resource scheduling use case have demonstrated that there is no reduction in the quality of the scheduling decision, while computational complexity of the model is reduced by at least a factor of 20.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer implemented method for training a Student Neural Network having a plurality of parameters, wherein the Student Neural Network is for generating an action prediction matrix for an environment in a communication network, the environment comprising a plurality of nodes corresponding to entities in the communication network and a plurality of communication network resources, wherein the action prediction matrix comprises a plurality of action predictions for actions that may be executed within the environment, and wherein each action prediction of the action prediction matrix relates to at least one of a node or a resource in the environment, the method, performed by a training node, comprising:

using a Reinforcement Learning process to train a Teacher Neural Network to generate an action prediction for a resource or node in the environment;

using the trained Teacher Neural Network to generate a first training data set by, for each of a plurality of training situations:

generating a representation of a state of the environment, the state representation comprising a current version of a partial action matrix that comprises actions for execution within the environment, each action relating to at least one of a node or a resource in the environment; and sequentially, for each node or each resource in the environment:

using the trained Teacher Neural Network to generate an action prediction relating to the node or resource based on the state representation;

adding the state representation and the generated action prediction to the first training data set;

selecting an action for execution on the node or the resource in accordance with the action prediction; and updating the state representation to include the selected action in the partial action matrix;

the method further comprising:

generating a second training data set from the first training data set by, for each of the plurality of training situations:

generating a training situation state representation comprising values that are common to all of the state representations for the training situation in the first training data set; and generating a training situation action prediction matrix comprising all of the generated action predictions for the training situation in the first training data set; and using the second training data set to update values of the parameters of the Student Neural Network;

wherein using a Reinforcement Learning process to train the Teacher Neural Network to generate an action prediction for a resource or node in the environment comprises:

sequentially, for each node or each resource in the environment:

generating a representation of a state of the environment;

using the teacher Neural Network to generate an action prediction relating to the node or resource based on the state representation for the environment;

using a selection function to select an action for execution on the node or the resource in accordance with the action prediction, the selected action being any configuration or resource allocation related action applicable to the node or the resource; and following execution of the selected action, updating parameters of the Teacher Neural Network based on an obtained measure of success of the executed action.

2. The method as claimed in claim 1, wherein the Teacher Neural Network is configured to:

receive as input the representation of a state of the environment, the state representation comprising a current version of a partial action matrix that comprises a plurality of actions for execution within the environment, each action relating to at least one of a node or a resource in the environment, process the input in accordance with current values of the Teacher Neural Network parameters; and output an action prediction relating to a node or a resource.

3. The method as claimed in claim 1, wherein the Student Neural Network is configured to:

receive as input a representation of a state of the environment;

process the input in accordance with current values of the Student Neural Network parameters; and output an action prediction matrix comprising a plurality of action predictions for actions that may be executed within the environment, each action prediction of the action prediction matrix relating to at least one of a node or a resource in the environment.

4. The method as claimed in claim 1, wherein an action prediction relating to a node or resource comprises an action prediction vector, each element of the action prediction vector corresponding to a possible action for the node or resource, and comprising a probability that the corresponding action is the most favorable of the possible actions according to a success measure for the environment.

5. The method as claimed in claim 1, wherein the action prediction matrix comprises a plurality of action prediction vectors for actions that may be executed within the environment, each action prediction vector relating to a node or resource in the environment;

wherein each element of an action prediction vector corresponds to a possible action for the node or resource to which the action prediction vector relates, and comprises a probability that the corresponding action is the most favorable of the possible actions according to a success measure for the environment.

6. The method as claimed in claim 1, wherein a partial action matrix comprises a matrix representation of:

nodes or resources in the environment;

possible actions that may be executed on the nodes or resources; and for each node or resource for which an action has been selected, an indication of the selected action.

7. The method as claimed in claim 4, wherein selecting an action for execution on the node or the resource in accordance with the action prediction comprises selecting the action on the basis of probabilities in the action prediction vector.

8. The method as claimed in claim 1, wherein the Teacher Neural Network is configured to output a Teacher Neural Network success prediction comprising a predicted value of a success measure for a current state of the environment, the Teacher Neural Network success prediction corresponding to selection of an action for the node or resource based on the action prediction output by the Teacher Neural Network.

9. The method as claimed in claim 1, wherein the Student Neural Network is configured to output a Student neural Network success prediction comprising a predicted value of a success measure for a current state of the environment, the Student Neural Network success prediction corresponding to selection of actions for nodes or resources based on the action prediction matrix output by the Student Neural Network.

10. The method as claimed in claim 9, wherein the success measure comprises a representation of at least one performance parameter for environment.

11. The method as claimed in claim 1, wherein generating the second training data set from the first training data set further comprises, for each of the plurality of training situations:

including, in the second training data set for the training situation, a final value of the Teacher Neural Network success prediction output by the Teacher Neural Network for the training situation during generation of the first training data set.

12. The method as claimed in claim 1, wherein generating a training situation state representation comprising values that are common to all of the state representations for a training situation in the first training data set comprises:

obtaining a final state representation for the training situation during generation of the first training data set; and removing the partial action matrix from the obtained state representation.

13. The method as claimed in claim 1, wherein using the second training data set to update the values of the Student Neural Network comprises, for training situations in the second training data set:

inputting the training situation state representation to the Student Neural Network, wherein the Student Neural Network processes the training situation state representation in accordance with current values of parameters of the Student Neural Network and outputs an action prediction matrix; and updating the values of the Student Neural Network parameters so as to minimize a loss function based on a difference between the action prediction matrix output by the Student Neural Network and the training situation action prediction matrix included in the second training data set.

14. The method as claimed in claim 13, wherein the Student Neural Network also outputs a Student Neural Network success prediction, and wherein the loss function is further based on a difference between the Student Neural Network success prediction output by the Student Neural Network and the Teacher Neural Network success prediction included the second training data set for the training situation.

15. The method as claimed in claim 1, wherein using a Reinforcement Learning process to train the Teacher Neural Network to generate an action prediction for a resource or node in the environment comprises:

generating a representation of a state of the environment, the state representation comprising a current version of a partial action matrix that comprises actions for execution within the environment, each action relating to at least one of a node or a resource in the environment; and sequentially, for each node or each resource in the environment:

performing a look ahead search of possible future states of the environment according to possible actions for the node or resource, wherein the look ahead search is guided by the Teacher Neural Network in accordance with current values of the Teacher Neural Network parameters and a current version of the state representation of the environment, and wherein the look ahead search outputs a search action prediction and a search success prediction;

adding the current version of the state representation, and the search action prediction and search success prediction output by the look ahead search, to a Teacher Neural Network training data set;

selecting an action for the node or resource in accordance with the search action prediction output by the look ahead search; and updating the current state representation of the environment to include the selected action in the partial action matrix; and using the Teacher Neural Network training data set to update the values of the Teacher Neural Network parameters.

16. The method as claimed in claim 1, wherein the environment comprises at least one of:

a cell of the communication network;

a sector of a cell of the communication network;

a group of cells of the communication network.

17. The method as claimed in claim 1, wherein the representation of a current state of the environment comprises at least one of:

a value of a network coverage parameter;

a value of a network capacity parameter;

a value of a network congestion parameter;

a current network resource allocation;

a current network resource configuration;

a current network usage parameter;

a current network parameter of a neighbor communication network cell;

a value of a network signal quality parameter;

a value of a network signal interference parameter;

a value of a network power parameter;

a current network frequency band;

a current network antenna down-tilt angle;

a current network antenna vertical beamwidth;

a current network antenna horizontal beamwidth;

a current network antenna height;

a current network geolocation;

a current network inter-site distance.

18. A system comprising a training node for training a Student Neural Network having a plurality of parameters, wherein the Student Neural Network is for generating an action prediction matrix for an environment in a communication network, the environment comprising a plurality of nodes corresponding to entities in the communication network and a plurality of communication network resources, wherein the action prediction matrix comprises a plurality of action predictions for actions that may be executed within the environment, and wherein each action prediction of the action prediction matrix relates to at least one of a node or a resource in the environment, the training node comprising processing circuitry configured to cause the training node to:

use a Reinforcement Learning process to train a Teacher Neural Network to generate an action prediction for a resource or node in the environment;

use the trained Teacher Neural Network to generate a first training data set by, for each of a plurality of training situations:

generating a representation of a state of the environment, the state representation comprising a current version of a partial action matrix that comprises actions for execution within the environment, each action relating to at least one of a node or a resource in the environment; and sequentially, for each node or each resource in the environment:

using the trained Teacher Neural Network to generate an action prediction relating to the node or resource based on the state representation;

adding the state representation and the generated action prediction to the first training data set;

selecting an action for execution on the node or the resource in accordance with the action prediction; and updating the state representation to include the selected action in the partial action matrix;

the processing circuitry being further configured to cause the training node to:

generate a second training data set from the first training data set by, for each of the plurality of training situations:

generating a training situation state representation comprising values that are common to all of the state representations for the training situation in the first training data set; and generating a training situation action prediction matrix comprising all of the generated action predictions for the training situation in the first training data set; and use the second training data set to update values of the parameters of the Student Neural Network;

wherein using a Reinforcement Learning process to train the Teacher Neural Network to generate an action prediction for a resource or node in the environment comprises:

sequentially, for each node or each resource in the environment:

generating a representation of a state of the environment;

using the teacher Neural Network to generate an action prediction relating to the node or resource based on the state representation for the environment;

using a selection function to select an action for execution on the node or the resource in accordance with the action prediction, the selected action being any configuration or resource allocation related action applicable to the node or the resource; and following execution of the selected action, updating parameters of the Teacher Neural Network based on an obtained measure of success of the executed action.

* * * * *